(12) United States Patent
Mathur et al.

(10) Patent No.: US 12,143,274 B2
(45) Date of Patent: Nov. 12, 2024

(54) METHOD, SYSTEM AND COMPUTER PROGRAM PRODUCT FOR IMPLEMENTING SITE COLLOCATION

(71) Applicant: RAKUTEN SYMPHONY, INC., Tokyo (JP)

(72) Inventors: Harsh Mathur, Indore (IN); Diksha Dubey, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 18/040,150

(22) PCT Filed: Nov. 17, 2022

(86) PCT No.: PCT/US2022/050187
§ 371 (c)(1),
(2) Date: Feb. 1, 2023

(87) PCT Pub. No.: WO2024/107190
PCT Pub. Date: May 23, 2024

(65) Prior Publication Data
US 2024/0259272 A1  Aug. 1, 2024

(51) Int. Cl.
*G06F 15/16* (2006.01)
*H04L 41/14* (2022.01)
(52) U.S. Cl.
CPC ................... *H04L 41/145* (2013.01)
(58) Field of Classification Search
CPC .................................................. H04L 41/145
USPC .......................................................... 709/220
See application file for complete search history.

(56) References Cited

U.S. PATENT DOCUMENTS

| | | | |
|---|---|---|---|
| 2010/0023607 A1* | 1/2010 | Venugopal | H04Q 3/0062 709/221 |
| 2011/0319067 A1* | 12/2011 | Adams | H04W 16/18 455/422.1 |
| 2015/0215790 A1* | 7/2015 | Davari | H04W 16/18 455/446 |
| 2016/0171405 A1* | 6/2016 | Burke | G06Q 10/06313 705/7.23 |
| 2016/0192041 A1* | 6/2016 | Pryor | H04Q 9/00 340/870.07 |
| 2023/0091638 A1* | 3/2023 | Medithe | H04W 72/54 709/224 |

FOREIGN PATENT DOCUMENTS

CN            101911608 A * 12/2010  ......... H04L 41/0816

* cited by examiner

*Primary Examiner* — Ruolei Zong
(74) *Attorney, Agent, or Firm* — HAUPTMAN HAM, LLP

(57) ABSTRACT

A method of implementing site collocation is performed at least in part by at least one processor and includes obtaining a first identification (ID) of an existing site corresponding to a nominal site. The method further includes modifying a first portion of the first ID, while maintaining a second portion of the first ID, to obtain a second ID of a collocation candidate site to be collocated with the existing site. The method further includes using the second ID for at least one of installation of the collocation candidate site as a collocated site at a physical location of the existing site, or communication with the collocated site upon completion of the installation.

20 Claims, 20 Drawing Sheets

Add Nominal Site

Site Location Details

Nominal Id* ← 201
12

Coverage Category*
Hot-spot

Branch Id ← 202
129

Area Id

2/100

Nominal Unique Id ← 203
129_01X371_35.17167824171 82_136.938299917042

Pole Type

204 → Pole Id
01X371

Pole Region

Pole Area Name

Pole Prefecture
Aichi

Pole City

Cluster 205 → Latitude
35.17167824171 82

206 → Longitude
136.938299917042

Number

Nominal Name ← 207
01X371

Phase*

208 → Cancel    209 → Add

FIG. 2A

| 261 | Design/Operation | |
|---|---|---|
| | Operator R | R |
| | Operator N | N |
| | Operator M | M |
| | Operator T | T |
| | Operator K | K |
| | Emergency | E |

| 262 | Vendor | |
|---|---|---|
| | Vendor A | A |
| | Vendor C | C |
| | Vendor E | E |
| | Vendor G | G |
| | Vendor N | N |
| | Vendor S | S |
| | Vendor T | T |

| 263 | Region (Jurisdiction) | |
|---|---|---|
| | Kanto | A |
| | Shinetsu | B |
| | Tokai | C |
| | Hokuriku | D |
| | Kinki | E |
| | Chugoku | F |
| | Shikoku | G |
| | Kyushu | H |
| | Tohoku | I |
| | Hokkaido | J |
| | Okinawa | O |

| 264 | Sub-Region | |
|---|---|---|
| | Prefecture | Code |
| | Ishikawa | 17 |
| | Fukui | 18 |
| | Yamanashi | 19 |
| | Nagano | 20 |
| | Gifu | 21 |
| | Shizuoka | 22 |
| | Aichi | 23 |
| | Mie | 24 |
| | Shiga | 25 |
| | Kyoto | 26 |
| | Osaka | 27 |
| | Hyogo | 28 |
| | Nara | 29 |
| | Wakayama | 30 |
| | Tottori | 31 |
| | Shimane | 32 |

| 266 | Class | |
|---|---|---|
| | Outdoor Macro | 0 |
| | Indoor (Small Cells) | 1 |
| | Outdoor Micro | 2 |
| | Passive DAS | 3 |
| | Active DAS | 4 |
| | Indoor Repeater | 5 |
| | Femto | 6 |
| | D-RAN | 7 |
| | Outdoor Repeater | 8 |
| | Wifi-6 | 9 |
| | Outdoor Micro (Indoor) | A |
| | Tower (Macro) | B |
| | Macro-Mobile Dead Area | K |

| 267 | Frequency Band | |
|---|---|---|
| | 1.7G | 1 |
| | 3.7G | 2 |
| | 28G | 3 |
| | Wi-Fi+ LTE(1.7G) | 4 |

| Azimuth | Antenna Height(mtrs) | Tilt |
| --- | --- | --- |
| 4 | 5 | 6 |

Sector 2

| Azimuth | Antenna Height(mtrs) | Tilt |
| --- | --- | --- |
| 78 | 9 | 0 |

Address 3 (Block)   Nearest Obsruction   Road Width (mtr)
                    8                    45

Is Fiber available at Pole
⊙ Yes  ○ No

TSS Status ◁—271       Remark ◁
OK                     Remark —272

Pole Circumference (mm) ◁—270    Candidate Site ID ▽ ◀—273(250)
45                               RAC2323000686
                                          ↖ 270
                                              ↙ 274

Sky View [+]    Whole Appearance [+]    Foot Of The Pole [+]

FIG. 2F

| Sites | | | | | | | |
|---|---|---|---|---|---|---|---|
| Name ←283  ID | 292 ←Phase 285←Stage | 286←Site Type | 287←Region | 288←Sub-Region | 289←Vendor | Actions |
| 01X371 ←291  129_01X371_35.1716782417182_136.9 | NA  Phase1-0 | TSSR Approved | 5G mmW Pole | TOKAI | AICHI | NA | ⋮ ←290 |
| AICHI_ABCD-223101_00357335.171  RAC2323000686  ↑ 294 | RAC2323000686 ←293  Phase1-0 | TSSR Approved | 5G mmW Pole Site | TOKAI | AICHI | NA | ⋮ ←290 |

| New | Inprogress | Closed | Blocked | Onhold    Page 1 ▾ Rows per page 25 ▾ 1-25 of 78511

FIG. 2G

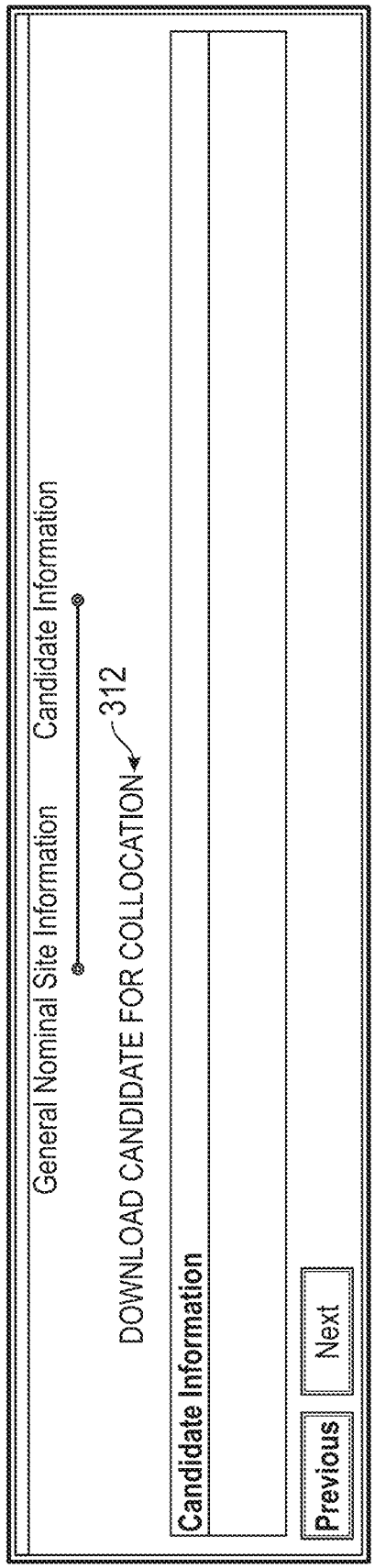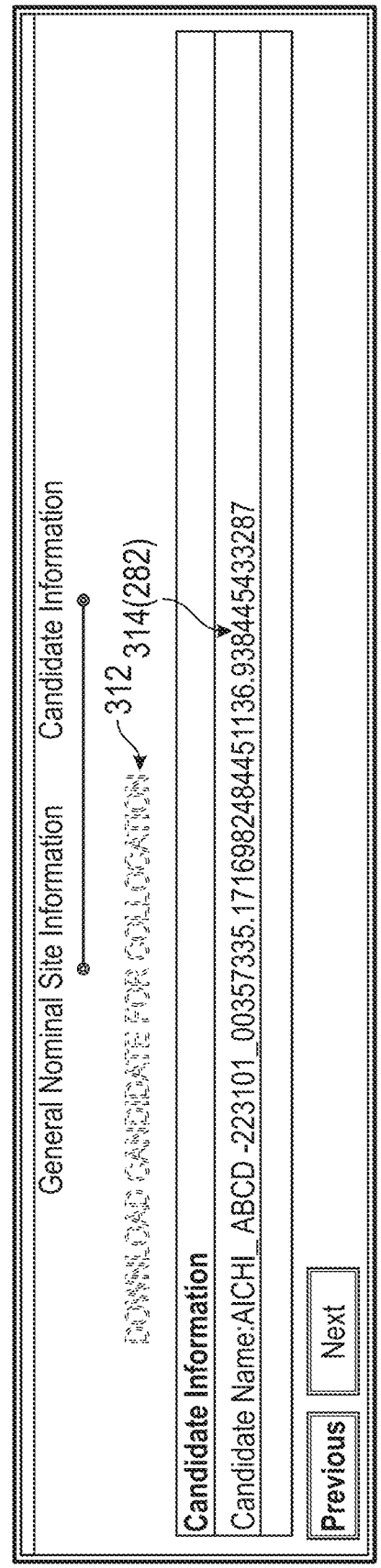
FIG. 3B
FIG. 3C

FIG. 3E

| Sites | | | | | | |
|---|---|---|---|---|---|---|
| Name ←283  ID | 292 284→ Phase 285→ | Stage 286→ | ≡ Site Type | Region 287→ | Prefecture 288→ | Vendor 289→ Actions |
| 01X371 ←291  129_01X371_35.17167782417182_136.9 | NA  Phase1-0 | TSSR Approved | 5G mmW Pole | TOKAI | AICHI | NA 290 |
| AICHI_ABCD-223101_00357335.171  REC2322000900  ↖381  382(350) | REC2322000900  Phase1-0 | TSSR Approved | 5G Sub6 Pole Site  375 | TOKAI | AICHI | NA 290 |
| AICHI_ABCD-223101_00357335.171  RAC2323000686  ↖293  294(250) | RAC2323000686  Phase1-0 | TSSR Approved | 5G mmW Pole Site | TOKAI | AICHI | NA 290 |

FIG. 3F

Basic Details

| Pole Nominal Name | | Site Type | Phase* |
|---|---|---|---|
| AICHL_ABCD_-223101_00357335_<br>1716982484451136.9384543328 | "Unique ID"<br>RAC2323000686 — 294 | 5G mmW Pole Site | Phase1-0 |
| Coverage Category*<br>Hot-spot  293 | Number<br>— | Branch ID<br>— | Area ID<br>— |
| Pole Area Name<br>— | Pole Type<br>— | Pole ID<br>ABCD-2 | Pole Region<br>TOKAI |
| Prefecture<br>AICHI | City<br>NAGOYA-SHI | Nominal Latitude<br>35.17169824844451 — 393 | Nominal Longitude<br>136.9384543287 |
| FEG Latitude<br>35.17169824845 | FEG Longitude<br>136.9384543287 | Technology<br>5G | Site Category<br>Outdoor |
| Band/Frequency(GHz)<br>28GHZ | Site Model<br>Utility Poles | Status*<br>Planned | ＞ On Air date*<br>📅 Enter date |
| Cluster ID<br>Cluster ID 1  292 | Cluster Name<br>Cluster name 1  382(350) | Poles Provider*<br>Provider 1 | ＞ DF Line ID<br>— |
| Collocated ID<br>REC2322000900 | Nominal Unique ID<br>129_01X371_35.17167782417182_<br>136.938299917042 | Collocation Yes/No<br>Yes  396 | Vendor<br>Vendor A |

FIG. 3G

Basic Details

Pole Nominal Name
AICHI_EFG-1023101_00335735.1683350175446136.934091598746

| | Unique ID | Site Type ← 325(332) |
| --- | --- | --- |
| | RAC23210000478 — 324(332) | ODSC |

Site Category Candidate    323(332)
Hot-spot

Coverage Category*
Hot-spot

Number
—

Phase*
Phase5

Area ID
—

Pole Area Name
—

Pole Type
—

Branch ID
—

Pole Region*
TOKAI

Prefecture    322
AICHI

City
NAGOYA-SHI

Pole ID
EFG-10

Nominal Longitude
136.934091598746

Nominal Unique ID
EFG-1023101_00335735.1683350175446136.934091598746

Nominal Latitude
35.1683350175446

FIG. 3H

Sites

| Pole Nominal Name | Unique ID | Site Type |
|---|---|---|
| AICHI_EFG-1023101_00335735735_16833501754461369340915598746 | RAC2323600478 — 360(340) | 5G mmW Pole ODSC |

345(340)

Coverage Category*  
Hot-spot — 343(340)

| | Number | Branch ID | Phase* |
|---|---|---|---|
| Pole Area Name | Pole Type | Pole ID | Phase4 |
| | | EFG-10 | Area ID |

| Prefecture | City | Nominal Latitude | Pole Region* |
|---|---|---|---|
| AICHI | NAGOYA-SHI | 35.16833501754456 | TOKAI |

| FEG Latitude | FEG Longitude | Technology | Nominal Longitude |
|---|---|---|---|
| 12.234567 | 123.345678 | 5G | 136.93409159874 — 346 |

| Band/Frequency(GHz) | Site Model | Status* | Site Category |
|---|---|---|---|
| 28GHZ | Utility Poles | Planned | Outdoor |

| Cluster ID — 322 | Cluster Name | Poles Provider* | On Air date* |
|---|---|---|---|
| Cluster ID 1 | Cluster name 1 | Provider 2 | |

| Nominal Unique ID | Vendor | | DF Line ID |
|---|---|---|---|
| EFG-1023101_00335735._16833501754461369340915598746 | Vendor A | | |

FIG. 3J

METHOD, SYSTEM AND COMPUTER PROGRAM PRODUCT FOR IMPLEMENTING SITE COLLOCATION

RELATED APPLICATIONS

The present application is a National Phase of International Application No. PCT/US2022/050187, filed Nov. 17, 2022.

TECHNICAL FIELD

The present disclosure is related to telecommunication, and in particular, to site installation, e.g., for expansion and/or upgrade, in communications systems.

BACKGROUND

Networking and telecommunication have enormous impacts on everyday lives, where user equipment such as smart phones, laptops, tablets, gaming consoles or the like, has become increasingly popular for work, entertainment, social networking or the like. To meet the increasing demand for more and/or better services, coverage, bandwidth, speed, service quality, service reliability, network efficiency, or the like, upgrades are made in communications systems on a regular basis. Time, labor and/or cost associated with upgrades are, however, considerations for operators of communications systems.

SUMMARY

In some embodiments, a method of implementing site collocation is performed at least in part by at least one processor and comprises obtaining a first identification (ID) of an existing site corresponding to a nominal site. The method further comprises modifying a first portion of the first ID, while maintaining a second portion of the first ID, to obtain a second ID of a collocation candidate site to be collocated with the existing site. The method further comprises using the second ID for at least one of installation of the collocation candidate site as a collocated site at a physical location of the existing site, or communication with the collocated site upon completion of the installation.

In some embodiments, a system for implementing site collocation comprises at least one processor, and at least one computer readable storage medium coupled to the at least one processor and configured to store executable instructions. The executable instructions, when executed by the at least one processor, cause the at least one processor to obtain first site information of an existing site corresponding to a nominal site. The first site information comprises a first identification (ID) of the existing site. The first ID indicates first communication technology supported by the existing site. The at least one processor is further caused to generate at least partially second site information of a collocation candidate site to be collocated with the existing site. The second site information comprises a second ID of the collocation candidate site. The second ID is based on the first ID and indicates second communication technology supported by the collocation candidate site. The second communication technology is different from the first communication technology. The at least one processor is further caused to use the second ID in at least one of instructing installation of the collocation candidate site as a collocated site at a physical location of the existing site, or communication with the collocated site upon completion of the installation.

In some embodiments, a computer program product comprises a non-transitory, tangible computer readable storage medium storing a computer program that, when executed by at least one processor, causes the at least one processor to obtain first site information of an existing site corresponding to a nominal site. The first site information comprises a first identification (ID) of the existing site. The first ID indicates first communication technology supported by the existing site. The at least one processor is further caused to generate at least partially second site information of a collocation candidate site to be collocated with the existing site. The second site information comprises a second ID of the collocation candidate site. The second ID is based on the first ID and indicates second communication technology supported by the collocation candidate site. The second communication technology is different from the first communication technology. The at least one processor is further caused to use the second ID in at least one of instructing installation of the collocation candidate site as a collocated site at a physical location of the existing site, or communication with the collocated site upon completion of the installation.

BRIEF DESCRIPTION OF THE DRAWINGS

Aspects of the present disclosure are best understood from the following detailed description when read with the accompanying FIGS. In accordance with the standard practice in the industry, various features are not drawn to scale. In fact, the dimensions of the various features be arbitrarily increased or reduced for clarity of discussion.

FIGS. 2A-2D and 2F-2G are schematic diagrams showing various screens of a user interface and FIG. 2E is a schematic diagram showing a site ID, in a system for implementing site collocation in accordance with some embodiments.

FIGS. 3A-3C, 3E-3H and 3J are schematic diagrams showing various screens of a user interface, whereas

FIGS. 3H and 3J are schematic diagrams showing various screens of a user interface and FIG. 3I is a schematic diagram showing a site ID and a modified site ID, in a system for implementing site collocation, in accordance with some embodiments.

DETAILED DESCRIPTION

Figure 1:
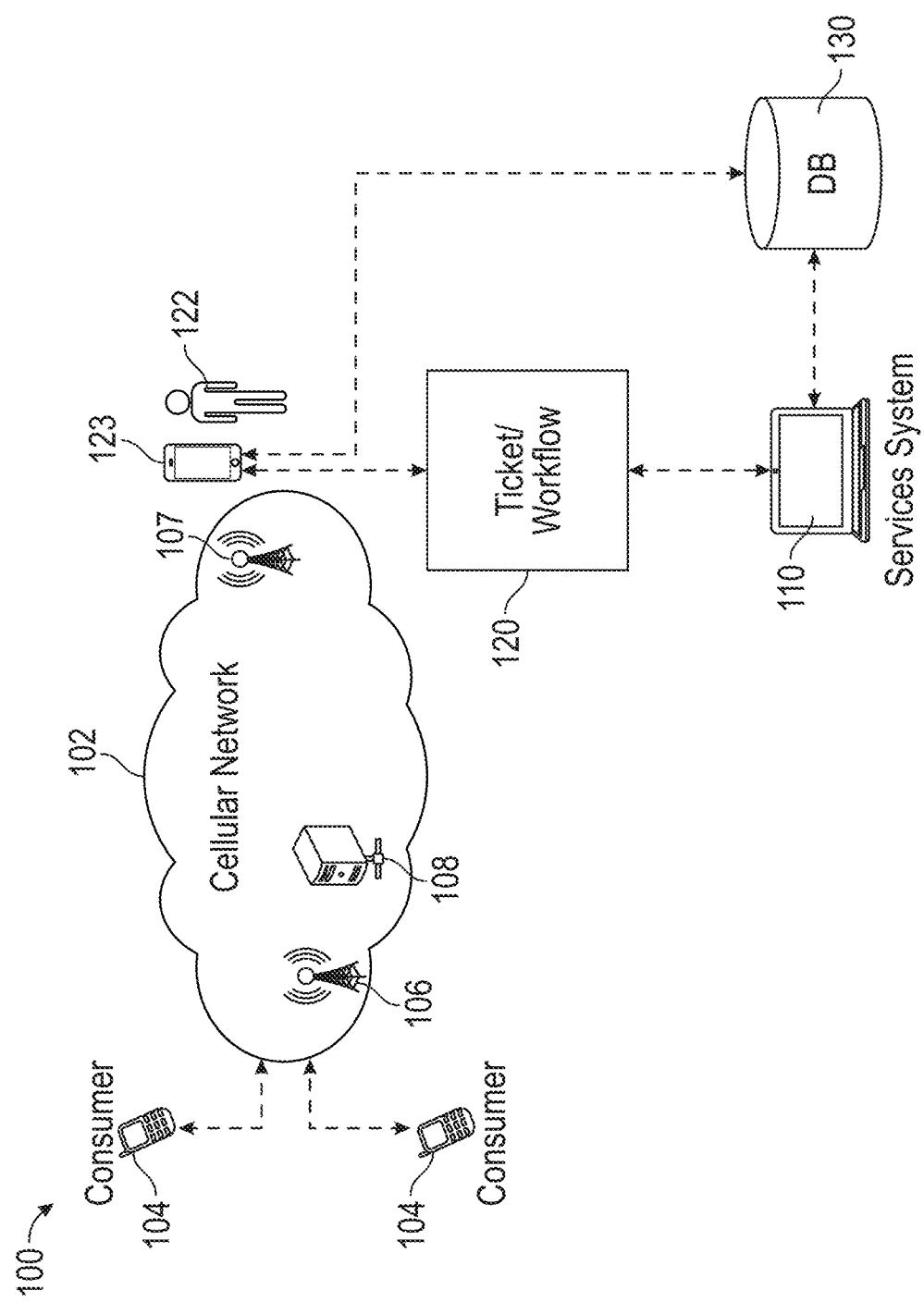
FIG. 1 is a schematic diagram of an example communications system in which site collocation in accordance with some embodiments is applicable.

The following disclosure includes many different embodiments, or examples, for implementing different features of the subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows include embodiments in which the first and second features are formed in direct contact, and also include embodiments in which additional features be formed between the first and second features, such that the first and second features not be in direct contact. In addition, the present disclosure repeats reference numerals and/or letters in the various examples. This repetition is for the purpose of simplicity and clarity and does not in itself dictate a relationship between the various embodiments and/or configurations discussed. Further, spatially relative terms, such as "beneath," "below," "lower," "above," "upper" and the like, be usable herein for ease of description to describe one element or feature's relationship to another element(s) or feature(s) as illustrated in the FIGS. The spatially relative terms are intended to encompass different orientations of the device in use or operation in addition to the orientation depicted in the FIGS. The apparatus be otherwise oriented (rotated 90 degrees or at other orientations) and the spatially relative descriptors usable herein likewise be interpreted accordingly.

In a typical situation in accordance with other approaches, an upgrade may be made in a communications system by planning, surveying, and installing supporting structure and communication equipment for a new site, e.g., a new base station, cell tower, access node, or the like. Such a process is time, labor and/or cost consuming.

In some embodiments, site collocation is implemented to avoid and/or mitigate one or more of the noted disadvantages of the other approaches. In a site collocation process, equipment of new or upgraded communication technology is installed at or on the same supporting structure of an existing site which already has equipment of different, existing communication technology installed thereon. The new or upgraded communication technology configures a new site collocated with the existing site, but providing new or upgraded communication technology to improve performance, customer experience, network efficiency, or the like. A simple example of site collocation includes additionally mounting 5G telecommunications antennas on the cell tower of an existing 4G site, with 4G telecommunications antennas already installed on the cell tower. Other site collocation examples are within the scopes of various embodiments. In at least one embodiment, site collocation permits various steps, such as site survey and supporting structure installation, to be omitted, thereby saving upgrading time, labor and/or cost.

In some embodiments, a site collocation process comprises reusing a unique site identification (ID) of an existing site, by modifying a portion, rather than the entirety, of the site ID of the existing site, to obtain a unique site ID for a collocated, new site. The site ID of the collocated, new site is then used for installation and/or operation of the collocated, new site. In at least one embodiment, the collocation status of the collocated, new site, i.e., the fact that it is collocated with an existing site, is reflected in the site ID of the collocated, new site. As a result, in one or more embodiments, it is possible to speed-up, simplify and/or facilitate the site collocation process. Further features and/or advantages are within the scopes of various embodiments.

FIG. 1 is a schematic diagram of an example communications system 100 in which site collocation in accordance with some embodiments is applicable.

In the example configuration of the communications system 100 in FIG. 1, consumers' mobile terminals 104 are coupled to a cellular network 102 to receive communication services. In an example, the cellular network 102 comprises a plurality of cells (not shown) in which cellular services are provided, through corresponding base stations or access nodes. Representative base stations 106, 107 are illustrated in FIG. 1. The base stations constitute a radio access network, and are coupled to a core network of the cellular network 102. A representative network device 108 of the core network is illustrated in FIG. 1. Examples of the cellular network 102 include, but are not limited to, a long term evolution (LTE) network, a fifth generation (5G) network, a sixth generation (6G) network, a non-standalone (NSA) network, a standalone (SA) network, a global system for mobile communications (GSM) network, a general packet radio service (GPRS) network, a code-division multiple access (CDMA) network, a Mobitex network, an enhanced GPRS (EDGE) cellular network, a Wi-Fi (or WIFI) network, a WIMAX network, or the like. Example configurations of the base stations include supporting structures each having one or more cellular antennas, one or more sets of transmitter/receivers transceivers, digital signal processors, control electronics, a Global Positioning System (GPS) receiver for timing (e.g., for CDMA2000/IS-95 or GSM systems). Examples of supporting structure include, but are not limited to, cell towers, buildings, utility poles, indoor supporting structures, or the like. In some embodiments, supporting structures further comprise site infrastructure including, but not limited to, primary and backup electrical power sources, air-conditioning or cooling arrangements, cables, ducts, sheltering, or the like. Examples of mobile terminals 104, include, but are not limited to, cell phones, tablets, media players, gaming consoles, personal data assistants (PDAs), laptops, and other electronic devices configured to transmit and/or receive cellular communication to/from the base stations of the cellular network 102. An example hardware configuration of a mobile terminal and/or a base station includes a computer system described with respect to FIG. 5, with the addition of one or more cellular antennas and corresponding cellular transceiving circuitry. Examples of communication technologies for performing cellular communications between base stations and mobile terminals include, but are not limited to, 2G, 3G, 4G, 5G, 6G, GSM, EDGE, WCDMA, HSPA, CDMA, LTE, DECT, WIFI, WiMAX, or the like. Examples of services provided over cellular communication, herein referred to as cellular communication services, include, but are not limited to, voice calls, data, emails, messages such as SMS and MMS, applications, and control signals. Example components (or network devices 108) of the core network include, but are not limited to, serving gateways (SGW), high rate packet data serving gateway (HSGW), packet data network gateway (PGW), packet data serving node (PDSN), mobility management entity (MME), home subscriber server (HSS), and policy control rules function (PCRF). The components of the core network are coupled with each other and with the base stations by one or more public and/or proprietary networks. An example hardware configuration of a component or network device 108 of the core network includes a computer system described with respect to FIG. 5.

The communications system 100 further comprises a services system 110 configured to create, manage and/or monitor various tickets (also referred to herein as workflows) in the communications system 100. An example workflow 120 is illustrated in FIG. 1. The services system 110 creates the workflow 120 and assigns to at least one person 122, e.g., a field engineer or technician, to handle.

Figure 2B:
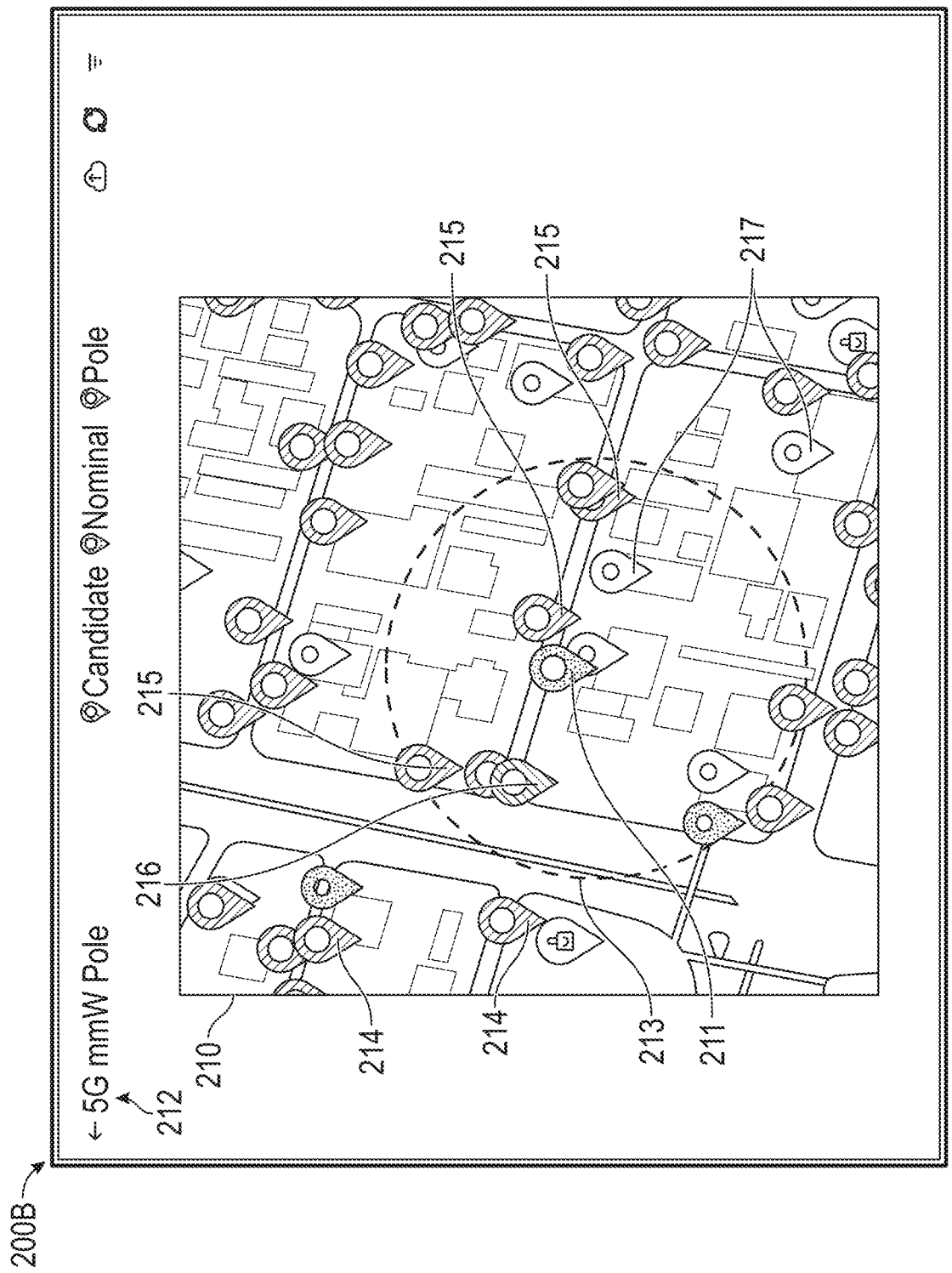
Figure 2C:
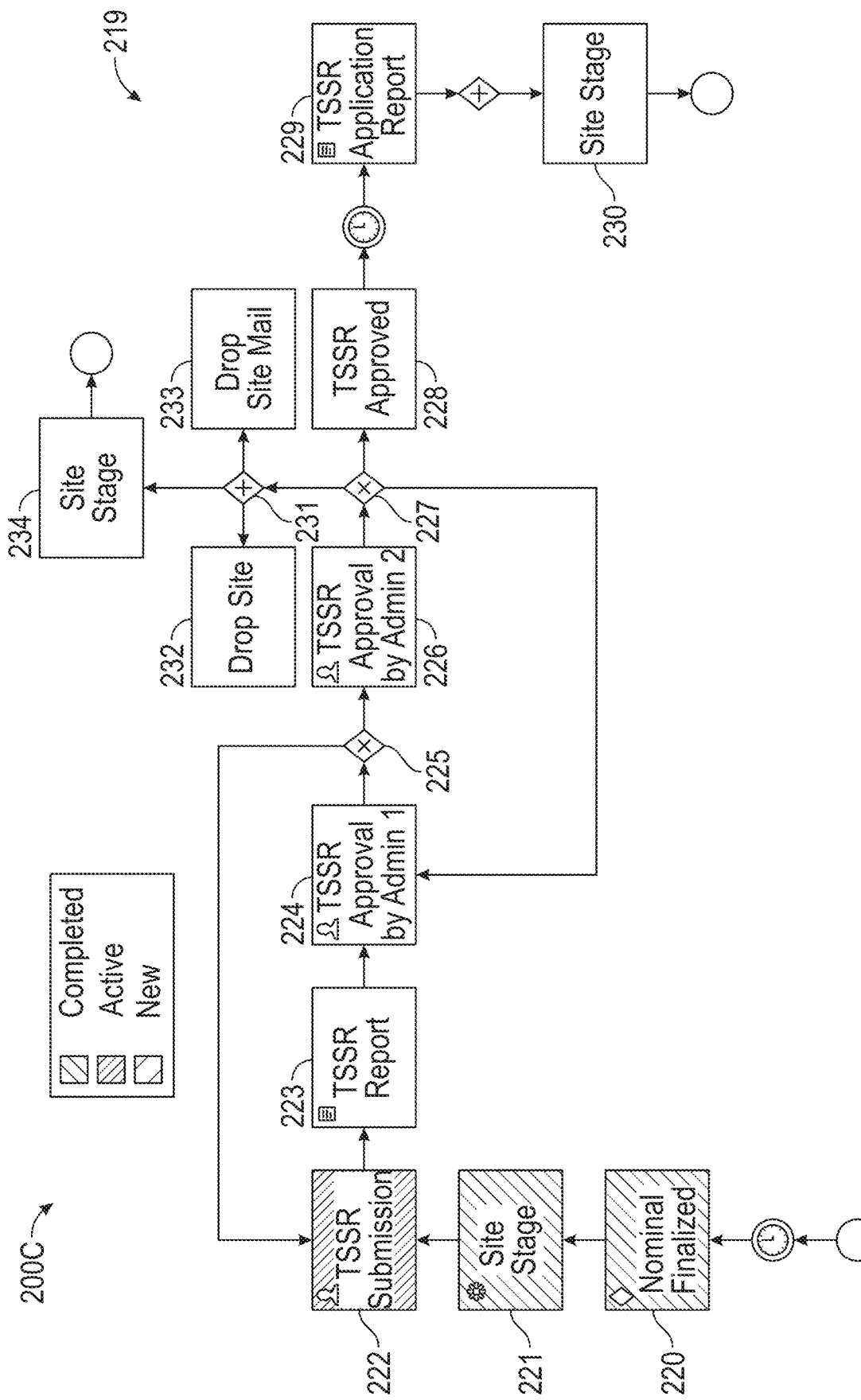

The person 122 uses his/her mobile equipment 123 (or another computer system) to display the workflow and/or to move the workflow through various status as described herein with respect to an example in FIG. 2C. In some embodiments, besides moving the workflow through various statuses, the person 122 performs one or more tasks required by the workflow 120. For example, the person 122 performs site survey, collects data and/or measurements regarding to one or more operations, functions, components, etc., of the cellular network 102. In the example configuration in FIG. 1, the person 122 performs tasks, such as surveying, installing, servicing or checking operations of the base station 107, in accordance with requirements, tasks or steps defined in the workflow 120. As the person 122 performs tasks required by the workflow 120, he/she moves the workflow from one status with completed tasks to a next status with further tasks to be performed, until the workflow 120 is completed (or otherwise terminated, e.g., cancelled). In some embodiments, a workflow is assigned to more than one persons to perform, and/or is automatically performed in whole, or in part in cooperation with one or more persons, by one or more computer systems.

In some embodiments, the services system 110 comprises one or more hardware components on/by which software corresponding to various algorithms and/or operations described here is executed. An example hardware configuration for any one or more of the components of the services system 110 includes a computer system described with respect to FIG. 5. For example, each of the components of the services system 110 and/or their corresponding modules includes executable instructions stored in at least one memory and executed by at least one processor. In some embodiments, one or more of the components, and/or subcomponents thereof, in the services system 110 are implemented on/by a cloud platform. Other hardware configurations are within the scopes of various embodiments.

The services system 110 is configured to provide a user interface (UI) for a user. In some embodiments, the UI comprises a graphic user interface (GUI). The UI is visually presented to the user to help the user to interact with the services system 110, e.g., during a site collocation process as described herein. In some embodiments, an example of visual presentation of one or more screens of a UI includes displaying the UI screens on a display, such as a monitor or a touch screen. The display may be a display of a computer system implementing one or more components of the services system 110, or a remote display coupled to one or more components of the services system 110 through a network or communication link. Other ways for visually presenting information, such as projection on a screen, three-dimensional (3D) projection, using glasses and/or other head-mounted devices, or any other manners for presenting information to be visually perceptible by a user, are within the scopes of various embodiments. For simplicity, "displaying" or "displayed" may be used in the following description as an example manner for visual presentation of information. Other manners for visual presentation, as discussed herein, are not excluded. A user may interact with displayed, or otherwise visually presented, information by a pointing device (e.g., a mouse), a touch screen, contact-less gestures, voice commands, or the like.

The communications system 100 further comprises one or more databases, schematically represented as a database 130. The database 130 is configured to store workflow data generated during, and/or as a result of, execution of one or more workflows, data collected/generated/entered by the person 122 and/or services system 110, such as site information, and/or workflow statuses as described herein. In some embodiments, the database 130 comprises one or more non-transitory computer-readable storage media, and/or is configured as part of one or more computer systems. Other database configurations are within the scopes of various embodiments. The described configuration of the communications system 100 is an example. Other communications system configurations are within the scopes of various embodiments.

Figure 2D:
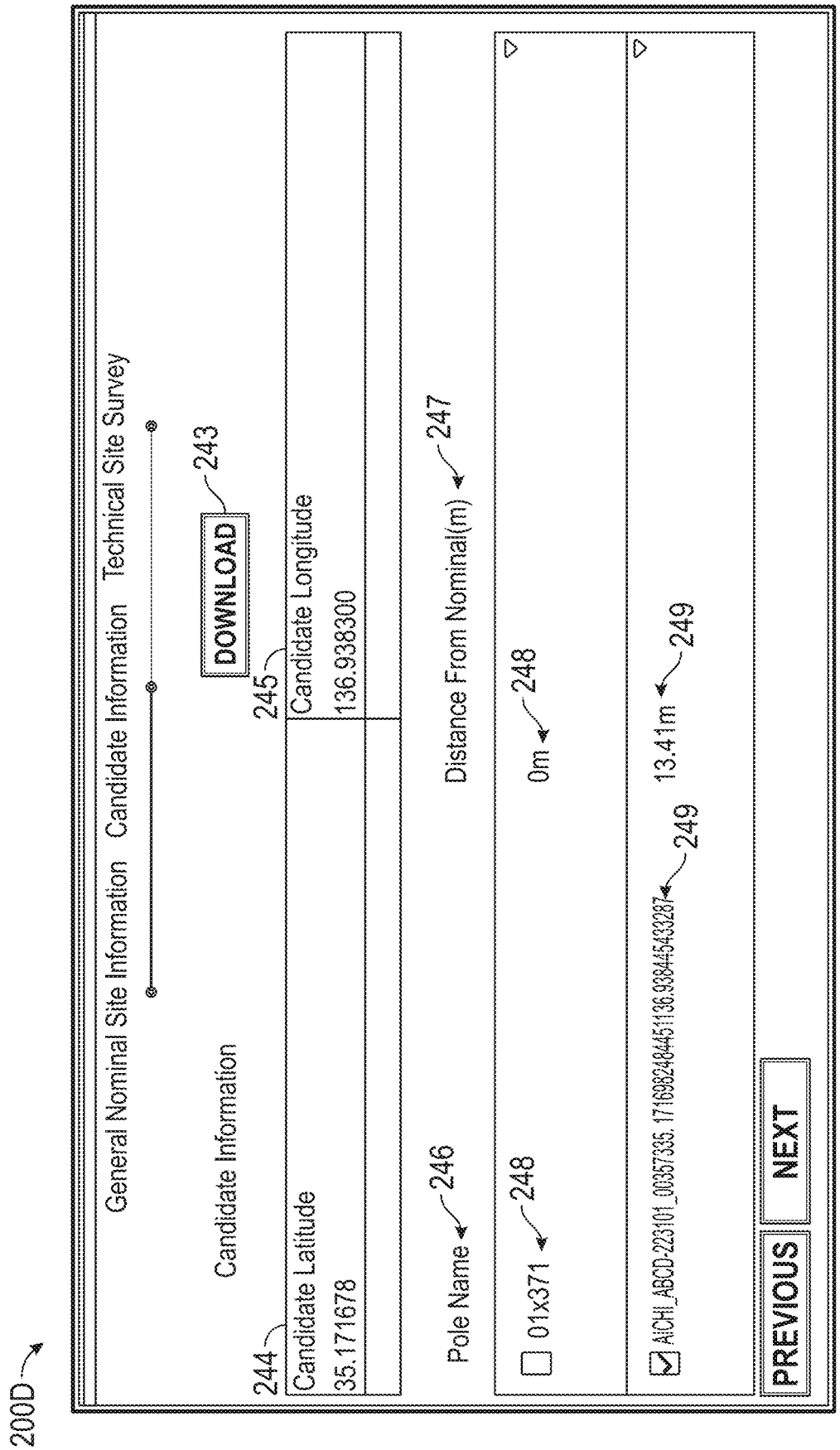
Figure 2E:
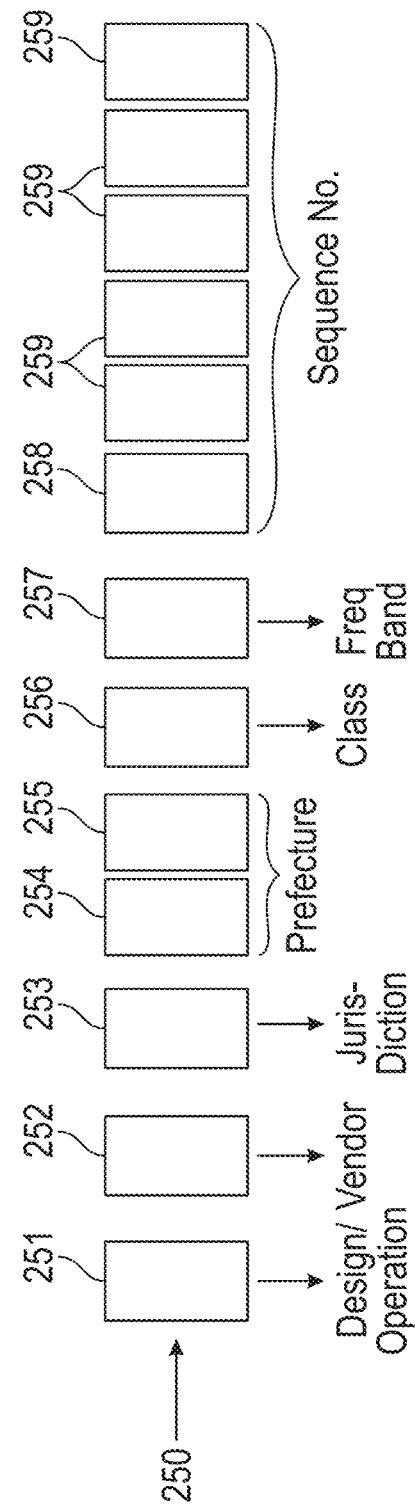

FIGS. 2A-2D and 2F-2G are schematic diagrams showing various screens of a user interface and FIG. 2E is a schematic diagram showing a site ID, in a system for implementing site collocation in accordance with some embodiments. In some embodiments, one or more of the UI screens in FIGS. 2A-2D and 2F-2G and/or the site ID in FIG. 2E are generated by and/or used in the services system 110. Further, one or more operations described herein are performed by at least one hardware processor and/or computer system on which one or more of the components and/or modules of the services system 110 are implemented. For simplicity, such operations are referred to as being performed by the system.

In FIG. 2A, a screen 200A of the user interface is displayed when a nominal site is added to the communications system 100. In some embodiments, a site is a base station or an access node. However, other site configurations are within the scopes of various embodiments. For example, in one or more embodiments, a site may be any component of the communications system 100 which has a supporting structure on which communication equipment is installable and/or upgradable. As described herein, in at least one embodiment, a supporting structure of a site comprises a physical construction, which may include, not only a tower, a building, a utility pole, an indoor supporting structure, or the like, but also site infrastructure such as primary and backup electrical power sources (e.g., batteries), air-conditioning or cooling arrangements, cables, ducts, sheltering, or the like. In one or more embodiments, communication equipment includes, but is not limited to, one or more antennas, beam steering mechanisms/systems, transceiving circuitry, control circuitry, modulating circuitry, any other electronic, and/or computer components configured to provide communication services, or the like. In some embodiments, not all communication equipment of a site is installed on a tower, building, utility pole, or the like. In an example, a part of communication equipment of a site is installed in a housing (sheltering) or on the ground in association, or connection, with the site infrastructure.

A nominal site is a location, or a reference point, where a site is planned to be installed, built or constructed. In some embodiments, a nominal site is determined by a human, e.g., an engineer, and/or by a computer system using a planning tool (e.g., planning software). In an example, a planning tool is configured to determine, as a nominal site, the best possible location in consideration of one or more factors including, but not limited to, the communication technology to be provided or supported, intended coverage (e.g., with consideration of the coverage areas of adjacent cells or sites), an estimated number of subscribers or customers to be served by the site, or the like.

In the example configuration in FIG. 2A, the screen 200A shows various information of the nominal site to be added, such as a nominal ID 201, a branch ID 202, a nominal unique ID 203, a pole ID 204, latitude 205, longitude 206, and nominal name 207. In some embodiments, the latitude 205 and longitude 206 are provided by the planning tool. The nominal name 207 is a site name of the nominal site. The nominal unique ID 203 is a unique ID of the nominal site, and is generated, e.g., by at least one processor. In the example in FIG. 2A, the nominal unique ID 203 "129_01X371_35.1716782417182_136.938299917042" is generated by combining the branch ID 202 "129", nominal name 207 "01X371", latitude 205 "35.1716782417182", and longitude 206 "136.938299917042". Other manners or rules for generating the nominal unique ID 203 are within the scopes of various embodiments. The screen 200A further comprises a Cancel button 208 to abort the nominal site addition process, and an Add button 209 to proceed with adding the nominal site.

In FIG. 2B, a screen 200B of the user interface shows a map 210 of an area including a nominal site 211. A site type 212 "5G mmW Pole" of the nominal site 211 indicates the communication technology to be provided, i.e., "5G mmW". The map 210 includes a plurality of existing physical constructions. In the example configuration in FIG. 2B, the existing physical constructions comprise utility poles (hereinafter "poles") 214-217. In an example, information about the poles 214-217 are retrieved from a utility company, and stored in the database 130 for access by the services system 110. For simplicity, utility poles are used as examples of existing physical constructions and/or supporting structures for site installation. Other types of existing physical constructions and/or supporting structures, such as cell towers, buildings, indoor supporting structures, or the like, are within the scopes of various embodiments.

Some of the poles, e.g., poles 217, are not available for site installation (i.e., installation of at least the communication equipment of a site). The remaining poles 214-216 are available for site installation. In an ideal or best-case scenario, where an available pole is found coinciding with the nominal site 211 and satisfies one or more requirements, the pole is selected for site installation, and a candidate site selection process as described herein is omitted. However, in reality, the nominal site 211 may not coincide with any of the available poles. In such a situation, available poles 215, 216 within a circle 213 centered on the nominal site 211 are candidates for site installation, and are referred to herein as candidate sites. The remaining available poles, i.e., poles 214, outside the circle 213 are not considered for site installation, because they are too far away from the desired location of the nominal site 211. The radius of the circle 213 corresponds to a maximum acceptable distance between the nominal site 211 and the location where a site is to be actually installed. The radius of the circle 213 depends on various factors, such as, coverage, quality of service (QoC), transmit power, or the like. In an examples, the radius of the circle 213 is 1 m, 15 m or 30 m. Other values of the radius of the circle 213 are within the scopes of various embodiments. As a result of a candidate site selection process described herein, a pole 216 is selected as the finalized candidate site where site installation is to be performed.

In FIG. 2C, a screen 200C of the user interface includes an example workflow 219 of a candidate site selection process. In some embodiments, a workflow configuration of the workflow 219 comprises one or more Extensible Markup Language (XML) documents to be executed by a workflow engine. In the example configuration in FIG. 2C, the workflow 219 is in compliance with the Business Project Management Notation (BPMN) specification. Other workflow configurations and/or specifications and/or programing language or codes are within the scopes of various embodiments.

The workflow 219 comprises a plurality of elements 220-234 arranged in a sequence determined by a user and/or a workflow template. The elements 220-234 are connected with each other by a plurality of connections (not numbered) to form a flowchart-type diagram that describes the corresponding sequence of items to be performed by one or more persons and/or by the system (e.g., at least one processor in the mobile equipment 123, services system 110 or another computer system). There are several types of elements in the workflow 219. For example, elements 222, 224, 226 are user tasks and are each indicated by a human icon. In some embodiments, a user task is an activity or work that is to be executable or performed by a person. For another examples, elements 225, 227, 231 are gateways. In some embodiments, a gateway defines a circumstance under which several options are available and require a person and/or the system to select one of the options to continue. The described workflow configuration is an example. Other workflow configurations with different connections, and/or types of elements such as events, other types of gateways and/or tasks, are within the scopes of various embodiments.

The workflow 219 begin with the element 220 at which a nominal site is finalized. In some embodiments, latitude and longitude of a nominal site is output by a planning tool, and one or more other information items related to the nominal site are provided by a person and/or the system to add/finalize the nominal site, as described with respect to FIGS. 2A-2B.

At the element 221, one or more operations in a process referred to as technical site survey (TSS) are performed. For example, a field engineer travels to the physical location of the finalized nominal site to determine whether a pole or a candidate site at, or in a vicinity of, the nominal site (as described with respect to FIG. 2B) is suitable for site installation. In at least one embodiment, the field engineer obtains a list of available candidate sites within a predetermined distance (e.g., the radius of the circle 213) from the nominal site. For example, the field engineer causes execution of a piece of software or script or an application programming interface (API) call to access a database of utility poles (or other types of physical constructions and/or supporting structures). The database is provided at, or accessible through, the services system 110. The executed software, script or API call returns a list of available candidate sites within a predetermined distance (e.g., 15 m) from the nominal site. The field engineer travels to the physical location of the nominal site to survey each of the available candidate sites beginning, e.g., from the candidate site closest to the nominal site.

Numerous factors, conditions and steps are considered/taken in the TSS process at each candidate site. For example, the field engineer may check whether an existing pole at a candidate site has an appropriate height (e.g., a particular transmitter or transceiver should be installed at least 20 meters from the ground). The field engineer may check whether the candidate site is physically accessible to workers for installation at that particular height, and/or whether an azimuth angle of transmitter can be kept at a particular level when installed at the candidate site, and/or whether there is any building or obstacle in a particular direction which may obstruct signals of the transmitters, or the like. The field engineer or another person may check whether a permit is required to access and/or perform installation at the candidate site (which may be, e.g., on top of a building), and/or whether owner (e.g., the building owner) agrees to lease the candidate site (e.g., building rooftop), and/or whether zoning approval or building permit is required or can be secured for installation at the candidate site. If the current candidate site is found unsatisfactory during a TSS process, a next candidate site is considered. The described list of actions to be performed in a TSS process is an example. Other actions for a TSS process are within the scopes of various embodiments.

At the elements 222 and 223, a TSS report (TSSR) is prepared and submitted at the end of the TSS process. For example, the TSSR indicates a candidate site found to be suitable for installation at, or near, the nominal site. A candidate site near the nominal site is understood as a candidate site within a predetermined distance from the nominal site, as described with respect to FIG. 2B.

At the element 224, the TSSR is considered for approval, e.g., by a first administrator.

At the element 225, if the first administrator finds the TSSR defective, the process returns to the element 222 for correction and/or update of the TSSR. If the first administrator finds the TSSR satisfactory and approves the TSSR, the process proceeds to the element 226.

At the element 226, the TSSR is considered for approval, e.g., by a second administrator at a higher level or in another department.

At the element 227, if the second administrator finds the TSSR defective but correctable, the process returns to the element 224 for correction and/or update of the TSSR. If the second administrator finds the TSSR satisfactory and approves the TSSR, the process proceeds to the element 228. In a third situation, the second administrator decides to drop the nominal site, e.g., when all available candidate sites around the nominal site have been found unsuitable, the process proceeds to the element 231.

At the element 228, the TSSR is marked as approved, and a candidate site indicated in the approved TSSR as being suitable for installation of the nominal site is considered the finalized candidate site.

At the element 229, a TSSR application report is issued.

At the element 230, various operations are performed at the finalized candidate site, e.g., to prepare for or to perform installation of a supporting structure, site infrastructure and/or communication equipment.

At the element 231, i.e., when a determination is made to no longer consider building (e.g., a base station or access node) at the nominal site, several actions at the elements 232, 233, 234 occur to correspondingly drop the nominal site, inform relevant parties of the decision to drop the nominal site, and close activities (e.g., survey) at the nominal site.

While the workflow 219 is being performed or executed, different statuses of various stages (or elements) are visually presented in corresponding different distinctive formats, e.g., different colors. In the example configuration in FIG. 2C, the stages or elements 220, 221 have been completed and are displayed with the green color, the stage or element 222 is currently being executed (i.e., active) and is displayed with the blue color, and the remaining stages or elements are new (i.e., not yet started/open) and are displayed in a neutral color, e.g., the white color. Alternatively, it is possible to monitor the progress and/or statuses of various stages of the workflow 219 in a separate screen (not shown) which does not contain the workflow 219. The described workflow 219 with various elements therein is an example. Other workflows for candidate site selection are within the scopes of various embodiments.

In FIG. 2D, a screen 200D of the user interface shows how to download site information of a candidate site corresponding to (i.e., at or near) the nominal site. For example, when a Download button 243 is selected or operated by a user, an API call is made to access a database of utility poles (or other types of physical constructions and/or supporting structures), and a list of available candidate sites within a predetermined distance (e.g., 15 m) from the nominal site is returned. It is possible that the list includes more than one candidate sites. For simplicity, the screen 200D shows that one candidate site 249 is returned from the database. The other site 248 displayed in the screen 200D is the nominal site itself. The site information of the candidate site 249 includes its latitude 244 (in a shortened form), longitude 245 (in a shortened form), pole name 246, and distance 247 (in meters) from the nominal site. The full latitude and longitude of the candidate site 249 are also included in its pole name, i.e., "35.1716982484451" and "136.938445433287." In an example, the nominal site 248 corresponds to the site 211 in FIG. 2B, the candidate site 249 corresponds to the pole 216 in FIG. 2B. When the candidate site 249 is selected as the finalized candidate site as described with respect to FIG. 2C, a unique site ID is generated for the finalized candidate site 249, as described with respect to FIG. 2E.

FIG. 2E is a schematic diagram showing a site ID 250 of a finalized candidate site, in a system for implementing site collocation in accordance with some embodiments. The site ID 250 comprises a plurality of symbols 251-259. In one or more embodiments described herein, each of the symbols 251-259 is an alphanumerical character. However, other symbols, e.g., Kanji characters or non-alphanumerical characters, are within the scopes of various embodiments.

The symbol 251 designates the design or operation of the finalized candidate site. For example, the symbol 251 designates an operator of the finalized candidate site, e.g., a telecommunications company that operates the finalized candidate site. Examples for names and corresponding codes of various operators are detailed in a table 261. For example, when the symbol 251 contains character or code R, it indicates that the operator of the finalized candidate site is Operator R.

The symbol 252 designates the vendor who will work on the finalized candidate site, e.g., to perform site installation at the finalized candidate site. Examples for names and corresponding codes of various vendors are detailed in a table 262. For example, when the symbol 252 contains character or code A, it indicates that the vendor associated with the finalized candidate site is Vendor A.

The symbol 253 designates the region in which the finalized candidate site is physically located. Examples for names and corresponding codes of various regions are detailed in a table 263. In these examples, the regions are in Japan and referred to as jurisdictions. For example, when the symbol 253 contains character or code C, it indicates that the finalized candidate site is physically located in region or jurisdiction Tokai (Japan).

The symbols 254, 255 together designate the sub-region in which the finalized candidate site is physically located. The sub-region is a smaller area within the region designated by the symbol 253. Examples for names and corresponding codes of various sub-regions are detailed in a table 264. For simplicity, the table 264 is partially shown in FIG. 2E, and the table 264 includes other, not-shown sub-regions and corresponding codes. In these examples, the sub-regions are in Japan and referred to as prefectures. For example, when the symbols 254, 255 together show code 23, it indicates that the finalized candidate site is physically located in prefecture Aichi (Japan) which is a prefecture within jurisdiction Tokai. The symbols 253-255 together designate information about the physical location of the finalized candidate site. Other types of regions and sub-regions are within the scopes of various embodiments. For example, for one or more embodiments applicable to the USA, regions are states and sub-regions are counties.

The symbol 256 designates the class of the finalized candidate site. In some embodiments, this class is defined by the site information of the nominal site. Examples for names and corresponding codes of various classes are detailed in a table 266. For example, when the symbol 256 contains character or code 2, it indicates that the class of the finalized candidate site is Outdoor Micro (outdoor micro cell).

The symbol 257 designates the frequency band of the finalized candidate site. In some embodiments, this frequency band is defined by the site information of the nominal site. Examples for names and corresponding codes of various frequency bands are detailed in a table 267. For example, when the symbol 257 contains character or code 3, it indicates that the frequency band of the finalized candidate site is 28G (28 GHz).

The frequency band is an example of communication technology supported by a site (e.g., a base station or access node). When a site, i.e., its communication equipment, is configured to support, or perform communication in, a higher frequency band, the communication speed is faster and services are provided to customers at a different level of experience and/or quality. Other examples of communication technology supported by a site are within the scopes of various embodiments. For example, in some embodiments, the communication technology supported by a site comprises one or more of network generations (e.g., 3G, 4G, 5G, 6G, or the like), antenna designs (e.g., uni-directional, omni-directional, or the like), etc. When a site is upgraded, or collocated, with a new or different communication technology as described herein, the change/upgrade in the communication technology may be a change/upgrade in the network generation (e.g., from 4G to 5G), and/or a change/upgrade in the antenna designs (e.g., from uni-directional antennas to omni-directional antennas), and/or a change/upgrade in the frequency band (with or without a change to a different network generation). The described examples of communication technology are non-exhaustive.

Besides communication technology, network generation is a further consideration, in accordance with some embodiments. One network generation differs from another network generation in one or more aspects including, but not limited to, frequency spectrum, peak (or maximum) speed, latency, connection density (e.g., the number of concurrently serviceable users within a unit area), or the like. Several examples of different network generations are given herein, i.e., 3G, 4G, 5G, 6G, or the like. Other network generations are within the scopes of various embodiments. For example, Wi-Fi is a network generation different from 3G, 4G, 5G, 6G. An example of site collocation within the same network generation, but with different communication technologies, is described with respect to FIGS. 3D-3G. A further example of site collocation with different network generations and, of course, with different communication technologies, is described with respect to FIGS. 3H-3J.

A series of the symbols 258, 259 designates a sequence number for identification and/or management purposes. In some embodiments, this sequence number is automatically generated by the system.

The described site ID 250 is an example. Other site IDs are within the scopes of various embodiments. For example, each of Design/Operation, Vendor, Region, Class, Frequency band may be represented by more than one symbol, and/or Sub-region may be presented by other two symbols, and/or Sequence No may include other than six symbols. In some embodiments, all symbols in the site ID 250 are automatically generated by the system. In at least one embodiment, at least a part of the site ID 250 is provided or specified by a person.

In FIG. 2F, a screen 200F of the user interface shows various items 270-274 of the site information of the finalized candidate site 249. In particular, the finalized candidate site 249 is given the following site ID 273 "RAC2323000686" corresponding to the site ID 250 described with respect to FIG. 5E. The site ID 273 "RAC2323000686" indicates the following information about the finalized candidate site 249: Operator R, Vendor A, physically located in region (jurisdiction) Tokai and sub-region (prefecture) Aichi, Class 2 (Outdoor Micro), frequency band of 28 GHz, and sequence number of 000686. Other site information items of the finalized candidate site 249 include TSS status 271, remarks 272, and photos 274 of actual scenes at the finalized candidate site 249. One or more of the site information items 270 are automatically generated or populated by the system from a database (e.g., the database 130). The remarks 272 and photos 274 are provided by a person, e.g., a field engineer. The described site information items are examples. Other possible items in site information are within the scopes of various embodiments.

In FIG. 2G, a screen 200G of the user interface shows sites created or managed by the system. For simplicity, a nominal site 281 and a corresponding finalized candidate site 282 are shown in the screen 200G, whereas other sites are omitted. The nominal site 281 corresponds to the nominal site 248 and/or 211, and is shown in a corresponding row in the screen 200G. The corresponding finalized candidate site 282 corresponds to the finalized candidate site 249 and/or 216, and is shown in a corresponding row in the screen 200G. Various information items are shown for each site, including site name/ID 283, phase 284, stage 285, site type 286, region 287, sub-region 288, vendor 289. One or more actions to be executed with respect to a site are shown, e.g., in a pop-up menu, when a corresponding action icon 290 is selected.

The nominal site 281 has a site name 291 "01X371," and a unique site ID 292 "129_01X371_35.1716782417182_136.938299917042" corresponding to nominal name 207 and nominal unique ID 203 described with respect to FIG. 2A. The nominal site 281 further has a site type "5G mmW Pole" corresponding to the site type 212 described with respect to FIG. 2B.

The finalized candidate site 282 has a site name 293 corresponding to the pole name of the candidate site 249 described with respect to FIG. 2D. The finalized candidate site 282 further has a unique ID 294 "RAC2323000686" as described with respect to FIG. 2F. The finalized candidate site 282 also has a site type "5G mmW Pole Site" which is generated based on the site type "5G mmW Pole" of the nominal site 281. The nominal site 281 is a planned site. The part "Site" in the site type of the finalized candidate site 282 indicates that the finalized candidate site is an actual site which corresponds to the planned nominal site and is configured/installed to provide communication services. Site information of the nominal site 281 and the corresponding finalized candidate site 282, as described with respect to FIGS. 2F-2G, is stored in a database, such as the database 130. Site installation is performed at the physical location of the finalized candidate site 282 to install communication equipment, with any required supporting structure or site infrastructure, and to configure the finalized candidate site 282 as a working site that provides communication services to customers. For example, the system instructs site installation at the finalized candidate site 282 in accordance with the site information of the finalized candidate site 282. When the site installation has been completed, the finalized candidate site 282 is referred to as an existing site. In some embodiments, the unique ID, e.g., "RAC2323000686," is used to identify the finalized candidate site 282 during the site installation, and/or during communication by/with the existing site after the site installation has been completed.

Figure 3A:
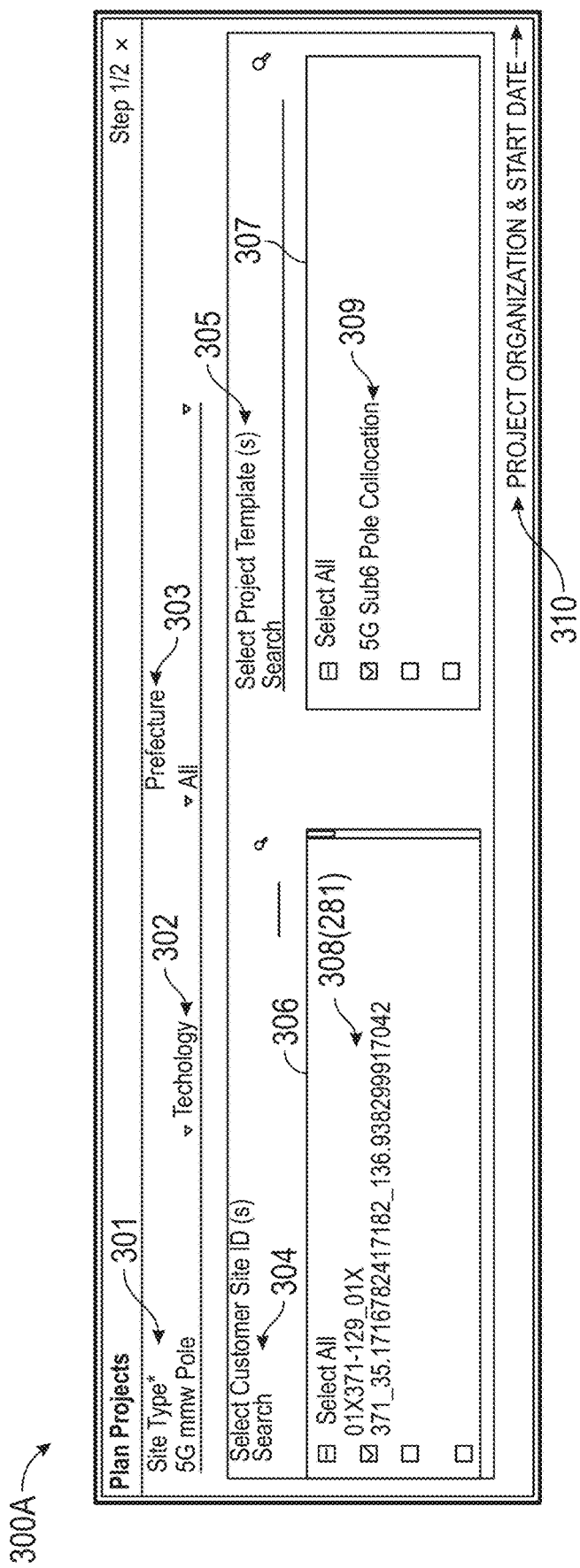
Figure 3D:
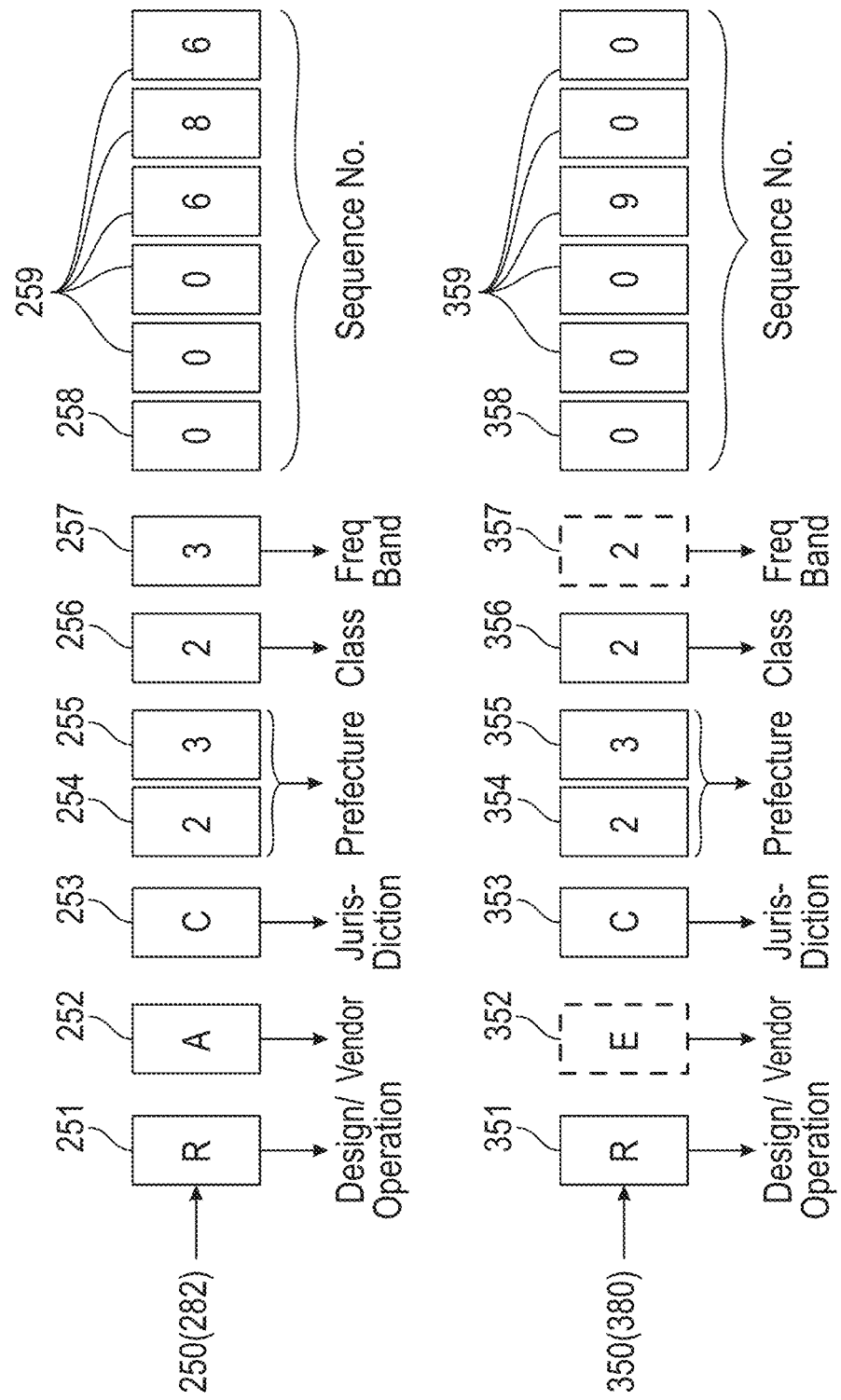
FIGS. 3D and 3I are schematic diagrams showing various examples of a site ID and a modified site ID, in a system for implementing site collocation, in accordance with some embodiments.
Figure 3E:
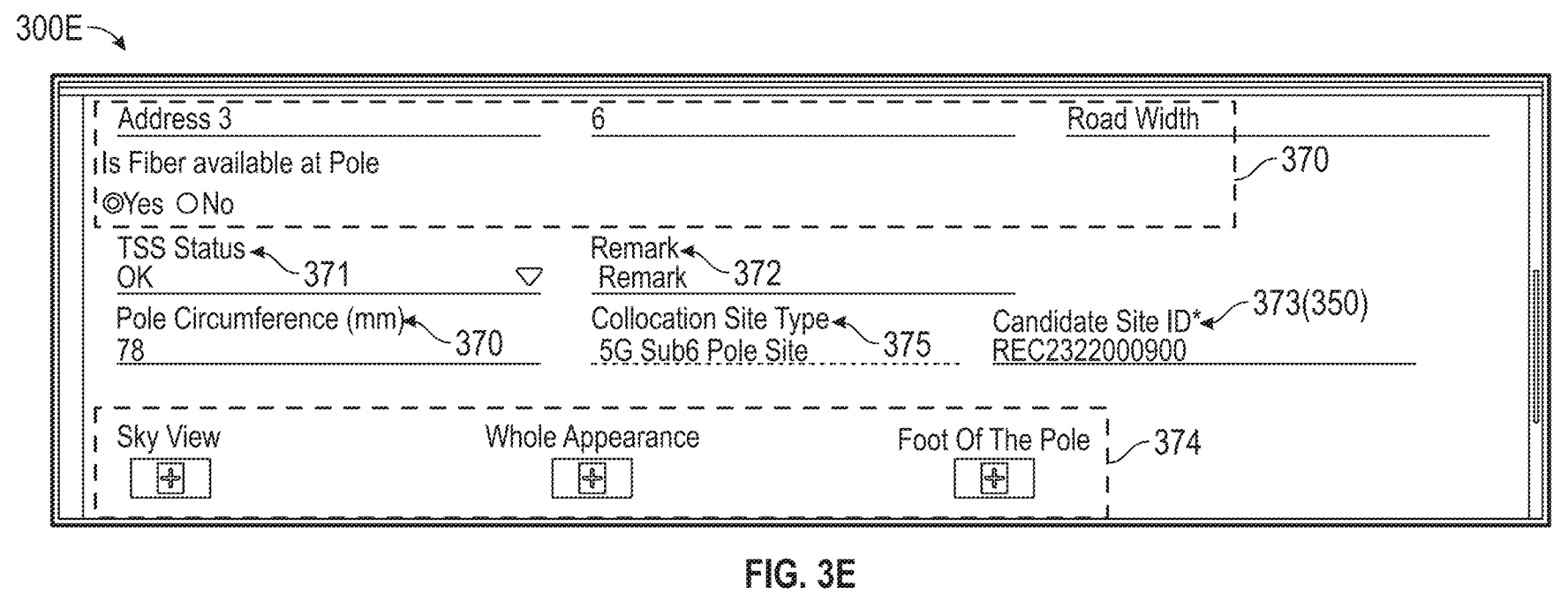
Figure 3I:
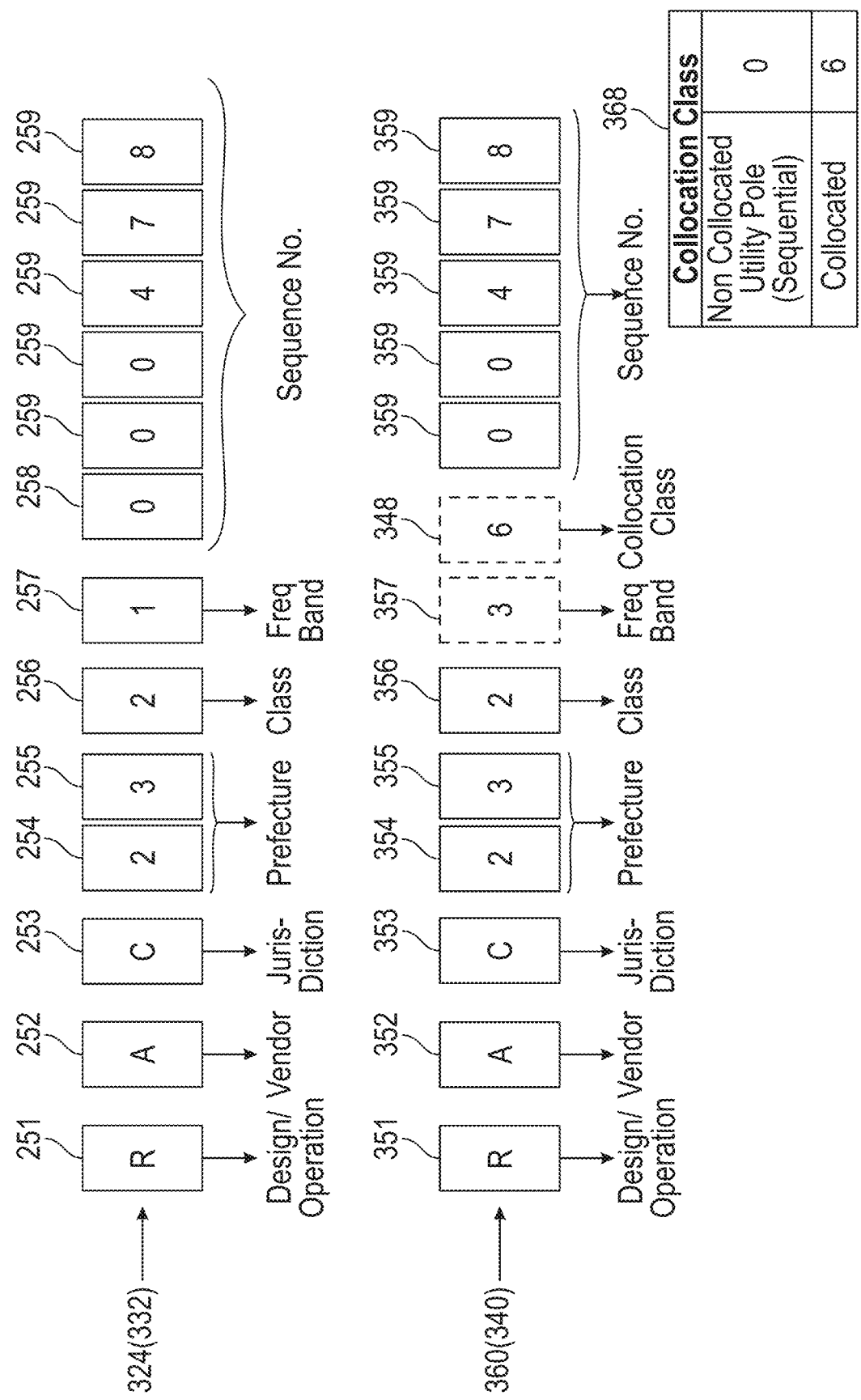

FIGS. 3A-3C, 3E-3H and 3J are schematic diagrams showing various screens of a user interface, whereas FIGS. 3D and 3I are schematic diagrams showing various examples of a site ID and a modified site ID, in a system for implementing site collocation, in accordance with some embodiments. In some embodiments, one or more of the UI screens in FIGS. 3A-3C, 3E-3H, 3J and/or the site IDs in FIGS. 3D, 3I are generated by and/or used in the services system 110 in a collocation process. Further, one or more operations described herein are performed by at least one hardware processor and/or computer system on which one or more of the components and/or modules of the services system 110 are implemented. For simplicity, such operations are referred to as being performed by the system.

In FIG. 3A, a screen 300A of the user interface is displayed at a beginning of a collocation process. The screen 300A is an example of a first input area for receiving user input of the nominal site and a collocation process (or workflow) to be performed for the nominal site. Specifically, the screen 300A permits a user to input and/or search for a nominal site that meets certain conditions. The screen 300A comprises drop-down menus 301, 302, 303 that permit the user to select various menu items (not shown) to narrow the search correspondingly based on site type, site technology, prefecture (or sub-region). Alternatively or additionally, the user may use a search field 304 to directly search for a desired nominal site based on site ID. One or more nominal sites corresponding to the selected menu items (not shown) of the drop-down menus 301, 302, 303 and/or satisfying the search query entered by the user at the search field 304 are displayed in an area 306. For simplicity, a nominal site 308 in the area 306 is displayed in detail, whereas other nominal sites in the area 306 are omitted. In the example in FIG. 3A, the nominal site 308 corresponds to the nominal site 281, and has the same site name "01X371" and the same unique site ID "129_01X371_35.1716782417182_136.938299917042" as the nominal site 281. The screen 300A shows that the nominal site 308 (i.e., the nominal site 281) is selected by the user.

The screen 300A further comprises a search field 305 that permits the user to search for a desired project, or workflow, to be executed with respect to the selected nominal site 281. One or more projects satisfying the search query entered by the user at the search field 305 are displayed in an area 307. For simplicity, a collocation workflow 309, "5G Sub6 Pole Collocation," in the area 307 is displayed in detail, whereas other projects or workflows in the area 307 are omitted. The screen 300A shows that the collocation workflow 309 is selected by the user. When the user proceeds by operating or selecting an item 310 on the screen 300A, the collocation workflow 309 is executed for the nominal site 281. In this example, the site type "5G mmW Pole" selected by the drop-down menu 301 indicates that the network generation of the nominal site 281 is 5G, and the collocation workflow 309, "5G Sub6 Pole Collocation," indicates that the network generation of a collocation candidate site to be collocated with the nominal site 281 is also 5G. In other words, this is an example of site collocation within the same network generation, i.e., 5G, but with different communication technologies, i.e., a 5G Sub6 (under 6 GHz) site is to be collocated with a 5G mmW (mmWave of 24 GHz and up) site.

In FIG. 3B, a screen 300B of the user interface is displayed to permit the user to download or obtain site information of a collocation candidate site corresponding to the selected nominal site 281, by operating or selecting an item 312 on the screen 300B. For example, an API call is made to access the database 130 to retrieve the site information of an existing site corresponding to the selected nominal site 281. The existing site corresponding to the selected nominal site 281 serves as the basis for configuring a collocation candidate site to be collocated with the existing site. The screen 300B is an example of a second input area which is visually presented upon user input (or selection) of the nominal site 308 and the collocation workflow 309 in the first input area in the screen 300A, and which receives user instruction to search for an existing site corresponding to the nominal site and obtain the site information of the existing site.

In FIG. 3C, a screen 300C of the user interface is displayed to show a download result, i.e., a site name 314 of the downloaded existing site. In the example in FIG. 3C, the site name 314 of the collocation candidate site is the same as the site name of the site 282, which corresponds to the selected nominal site 281 and which has become an existing site after completion of the site installation as described with respect to FIGS. 2A-2G. The existing site 282 serves as the basis for configuring a collocation candidate site. Besides the displayed site name, one or more other items in the site information of the existing site 282, as described with respect to FIG. 2F, are also downloaded or obtained. The downloaded or obtained site information includes the unique site ID 250 of the existing site 282 which is partially reused and partially modified to obtain a site ID for a collocation candidate site, as described with respect to FIGS. 3D, 3I.

In some embodiments, where the nominal site selected or input by the user on the screen 300A does not already have an existing site corresponding thereto, the system is configured to search for an existing site (e.g., a working site with already constructed supporting structure and/or site infrastructure) which is nearest to the selected nominal site and satisfies one or more predefined conditions, e.g., as defined in the collocation workflow 309. The search is performed in the database 130, and in a manner similar to the methodology described with respect to FIG. 2A, with a distinction that the search returns a list of one or more existing sites (rather than mere utility poles) within a predetermine distance from the selected nominal site. In the returned list, the nearest existing site to the selected nominal site is considered first to determine whether it meets one or more predefined conditions, e.g., there are no tall buildings around the existing site that may obstruct wireless signals, or the like. If the nearest existing site satisfies the predefined conditions, it is selected as a collocation candidate site; otherwise, a next nearest existing site in the returned list is considered to determine whether it meets the predefined conditions and can be selected as a collocation candidate site, and so on. A collocation candidate site determined in this process is further processed as described with respect to FIGS. 3D-3G in an example of site collocation within the same network generation, but with different communication technologies.

FIG. 3D is a schematic diagram showing the site ID 250 of a finalized candidate site which has become the existing site 282 after completion of the site installation at the finalized candidate site, and a site ID 350 of a collocation candidate site 380 to be collocated at the same physical location as, e.g., on the same supporting structure of, the existing site 282, in accordance with some embodiments.

The site ID 250 of the existing site 282 comprises a plurality of symbols 251-259 as described with respect to FIG. 2E. In the example in FIG. 3D, specific characters corresponding to the site ID "RAC2323000686" as described with respect to FIG. 2F are shown for the corresponding symbols 251-259.

The site ID 350 of the collocation candidate site 380 comprises a plurality of symbols 351-359. In this example of site collocation within the same network generation, the symbols 351-359 correspond to the symbols 251-259 of the site ID 250. Specific characters or codes for the symbols 351-359 are defined in the tables 261-267, described with respect to FIG. 2E.

In some embodiments, the site ID 350 of the collocation candidate site 380 is obtained by modifying a portion of the site ID 250, while maintaining another portion of the site ID 250. For example, the portion of the site ID 250 that remains in the site ID 350 comprises the information about the physical location of the existing site 282, because the collocation candidate site 380 and the existing site 282 are to be collocated. Thus, the characters in symbols 253-255 of the site ID 250 are the same as the characters in symbols 353-355 of the site ID 350. The portion of the site ID 250 that remains in the site ID 350 further comprises the class symbol. Thus, the character in the symbol 256 of the site ID 250 is the same as the character in the symbol 356 of the site ID 350.

In the example in FIG. 3D, the character in the symbol 251 of the site ID 250 is the same as the character in the symbol 351 of the site ID 350, indicating that the same Operator operates both the existing site 282 and the collocation candidate site 380. In some embodiments, the character in the symbol 251 of the site ID 250 is different from the character in the symbol 351 of the site ID 350 where different Operators operate the existing site 282 and the collocation candidate site 380.

In the example in FIG. 3D, the character in the symbol 252 of the site ID 250 is different from the character in the symbol 352 of the site ID 350, indicating that different Vendors are associated with the existing site 282 and the collocation candidate site 380. In some embodiments, the character in the symbol 252 of the site ID 250 is the same as the character in the symbol 352 of the site ID 350 where the same Vendor is associated with both the existing site 282 and the collocation candidate site 380.

The portion of the site ID 250 that is modified to obtain a corresponding portion in the site ID 350 comprises information about different communication technologies correspondingly supported by the existing site 282 and the collocation candidate site 380. In the example in FIG. 3D, the character in the symbol 257 of the site ID 250 is different from the character in the symbol 357 of the site ID 350, indicating that the existing site 282 and the collocation candidate site 380 support different communication technologies. Specifically, the character "2" in the symbol 357 of the site ID 350 indicates, with reference to the table 267 in FIG. 2E, that the frequency band of the collocation candidate site 380 is 3.7 GHz. This information is consistent with, and defined by, the collocation workflow 309 which is directed to collocation of a 5G Sub6 (under 6 GHz) site. The character "3" in the symbol 257 of the site ID 250 indicates, with reference to the table 267 in FIG. 2E, that the frequency band of the existing site 282 is 28 GHz, i.e., a different communication technology from the sub 6 GHz communication technology of the collocation candidate site 380.

The portion of the site ID 250 that is modified to obtain a corresponding portion in the site ID 350 comprises the symbols 258-259 designating the sequence number of the site ID 250. The corresponding sequence number of the site ID 350 includes symbols 358-359 corresponding to the symbols 258-259. One or more of the symbols 359 of the site ID 350 are different from the corresponding one or more of the symbols 259 of the site ID 250. In other words, the sequence number (e.g., "000900") of the site ID 350 is different from the sequence number (e.g., "000686") of the site ID 250. The total number of symbols in the site ID 350 remains the same as the total number of symbols in the site ID 250. As a result, in at least one embodiment, no significant changes are needed by the system to adapt to the new or modified format of the site ID 350.

In the example in FIG. 3D, the collocation candidate site 380 is given a unique site ID "REC2322000900". This site ID indicates the following information about the collocation candidate site 380: Operator R, Vendor E, physically located in region (jurisdiction) Tokai and sub-region (prefecture) Aichi, Class 2 (Outdoor Micro), frequency band of 3.7 GHz, and a sequence number of 000900. To indicate the collocation status of the collocation candidate site 380 and the existing site 282, a collocation flag is generated by the system, as described with respect to FIG. 3G.

In some embodiments, the site ID 350 of the collocation candidate site 380 is automatically generated by the system. In at least one embodiment, the site ID 350 of the collocation candidate site 380 is specified, wholly or partly, by the user. In some embodiments, site installation is performed at the physical location of the existing site 282 to install communication equipment of the collocation candidate site 380 on the supporting structure, and/or using the site infrastructure, of the existing site 282. The communication equipment of the collocation candidate site 380 supports different communication technology from the communication technology supported by the communication equipment of the existing site 282. The installed communication equipment of the collocation candidate site 380 configures the collocation candidate site 380 as a working site that provides communication services to customers, using different communication technology from that of the existing site 282. For example, the system instructs site installation at the collocation candidate site 380 in accordance with the site information of the collocation candidate site 380. When the site installation has been completed, the collocation candidate site 380 may be referred to as a collocated site. In some embodiments, the unique site ID 350 of the collocation candidate site 380 is used to identify the collocation candidate site 380 during the site installation at the same physical location as the existing site 282, and/or during communication by/with the collocated site after the site installation has been completed.

In FIG. 3E, a screen 300E of the user interface shows various site information 370-375 of the collocation candidate site 380. The screen 300E is similar to the screen 200F and includes various items 370-375 of the site information of the collocation candidate site 380. The site information items 370-374 correspond to the site information items 270-274 described with respect to FIG. 2F. In particular, the collocation candidate site 380 is given the site ID 373 corresponding to the site ID 350 described with respect to FIG. 3D. Other site information items of the collocation candidate site 380 include TSS status 371, remarks 372, photos 374 of actual scenes at the collocation candidate site 380, and site type 375. One or more of the site information items 370 are automatically generated or populated by the system from a database (e.g., the database 130). The remarks 372 and photos 374 are provided by a person, e.g., a field engineer. The site type 375, "5G Sub6 Pole Site," is consistent with, and defined by, the collocation workflow 309 which is directed to collocation of a 5G Sub6 pole. The described site information items are examples. Other possible items in site information are within the scopes of various embodiments.

In FIG. 3F, a screen 300F of the user interface shows sites created or managed by the system. The screen 300F is similar to the screen 200G and includes various items 281-294 described with respect to FIG. 2G. For simplicity, the nominal site 281, the existing site 282 corresponding to the nominal site 281, and the collocation candidate site 380 corresponding to the nominal site 281 and collocated with the existing site 282 are shown in the screen 300F, whereas other sites are omitted. Compared to the screen 200G, the screen 300F additionally shows the collocation candidate site 380. A site name 381 of the collocation candidate site 380 is the same as the site name 293 of the existing site 282, because the collocation candidate site 380 and the existing site 282 are collocated at the same physical location. A site ID 382 of the collocation candidate site 380 corresponds to the site ID 350 and is obtained by modifying the site ID 294/250 of the existing site 282, described with respect to FIG. 3D. Site information of the collocation candidate site 380, as described with respect to FIGS. 3E-3F) is stored in a database, such as the database 130. Site installation is performed at the physical location of the existing site 282 to install communication equipment of the collocation candidate site 380 on the supporting structure, and/or using the site infrastructure, of the existing site 282. For example, the system instructs site installation at the existing site 282 in accordance with the site information of the collocation candidate site 380. When the site installation has been completed, the collocation candidate site 380 becomes a working site and is referred to as a collocated site. In some embodiments, the unique ID 350, e.g., "REC23222000900," is used to identify the collocation candidate site 380 during the site installation at the physical location of the existing site 282, and/or during communication by/with the collocated site after the site installation has been completed.

In FIG. 3G, a screen 300G of the user interface shows basic details of the existing site 282, including its site name 293 and site ID 294, the site ID 292 of the corresponding nominal site 281, the site ID 382 of the collocated site (or collocation candidate site before site installation) 380, physical location information 393, and a collocation flag 396. The physical location information 393 includes the latitude and longitude of the existing site 282 (or candidate site 249 before site installation) as described with respect to FIG. 2D. The collocation flag 396 may be Yes or No corresponding to the presence or absence of a site collocated with the existing site 282. In the example in FIG. 3G, the collocation flag 396 is Yes, corresponding to the presence of the collocated site (or collocation candidate site) 380 at the existing site 282. In some embodiments, the collocation flag 396 "Yes" is automatically generated by the system, e.g., when the collocation workflow 309 is executed.

As described herein, FIGS. 3D-3G provide an example of site collocation within the same network generation, but with different communication technologies. A further example of site collocation with different network generations and with different communication technologies is described next with respect to FIGS. 3H-3J.

In some embodiments, a collocation process for site collocation with different network generations also begins with a screen similar to the screen 300A in FIG. 3A, except that user input of the nominal site and a collocation process (or workflow) to be performed for the nominal site involve different network generations. For example, the user selects a 4G ODSC (Outdoor Small Cell) site as a nominal site through the drop-down menu 301 and/or the input area 306, and further selects a 5G mmW collocation process (or workflow) through the input area 307 in the screen 300A. As a result, the collocation process is performed for collocating a 5G mmW site at an existing 4G ODSC site. The collocation process further proceeds to permit the user to download or obtain site information of an existing site corresponding to the nominal site, as described with respect to FIGS. 3B, 3C.

In FIG. 3H, a screen 300H of the user interface is displayed to show some details of the site information of an existing site 332 corresponding to the nominal site selected by user input. Specifically, the screen 300H shows that the existing site 332 has a site name 323 and a site ID 324 correspondingly similar to the site name 293 and site ID 294 described with respect to FIGS. 3F-3G. The screen 300H further shows a unique site ID 322 of the nominal site which was selected by the user and to which the existing site 332 corresponds. The unique site ID 322 is similar to the unique site ID 292 described with respect to FIGS. 3F-3G. The screen 300H further shows a site type 325 "ODSC" of the existing site 332, i.e., the existing site 332 is an existing 4G ODSC site.

FIG. 3I is a schematic diagram showing the site ID 324 of the existing site 332, and a site ID 360 of a collocation candidate site 340 to be collocated at the same physical location as, e.g., on the same supporting structure of, the existing site 332, in accordance with some embodiments.

The site ID 324 of the existing site 332 comprises a plurality of symbols 251-259 as described with respect to FIG. 2E. In the example in FIG. 3I, specific characters corresponding to the site ID 324 are "RAC2321000478" and are shown for the corresponding symbols 251-259.

The site ID 360 of the collocation candidate site 340 comprises a plurality of symbols 351-357, 348 and 359. The symbols 351-357 and 359 correspond to the symbols 251-257 and 259 of the site ID 324. Specific characters or codes for the symbols 351-357 are defined in the tables 261-267, described with respect to FIG. 2E. Example specific characters or codes for the symbol 348 are defined in a table 368 as described herein.

In some embodiments, the site ID 360 of the collocation candidate site 340 is obtained by modifying a portion of the site ID 324, while maintaining another portion of the site ID 324. For example, the portion of the site ID 324 that remains in the site ID 360 comprises the information about the physical location of the existing site 332, because the collocation candidate site 340 and the existing site 332 are to be collocated. Thus, the characters in symbols 253-255 of the site ID 324 are the same as the characters in symbols 353-355 of the site ID 360. The portion of the site ID 324 that remains in the site ID 360 further comprises the class symbol. Thus, the character in the symbol 256 of the site ID 324 is the same as the character in the symbol 356 of the site ID 360.

In the example in FIG. 3I, the characters in the symbols 251, 252 of the site ID 324 are the same as the characters in the symbols 351, 352 of the site ID 360, indicating that the same Operator and Vendor are associated with both the existing site 332 and the collocation candidate site 340. In some embodiments, the character(s) in the symbol 251 and/or symbol 252 of the site ID 324 is/are different from the character(s) in the symbol 351 and/or symbol 352 of the site ID 360 where different Operators and/or Vendors are associated with the existing site 332 and the collocation candidate site 340.

The portion of the site ID 324 that is modified to obtain a corresponding portion in the site ID 360 comprises information about different communication technologies correspondingly supported by the existing site 332 and the collocation candidate site 340. In the example in FIG. 3I, the character in the symbol 257 of the site ID 324 is different from the character in the symbol 357 of the site ID 360, indicating that the existing site 332 and the collocation candidate site 340 support different communication technologies. Specifically, the character "3" in the symbol 357 of the site ID 360 indicates, with reference to the table 267 in FIG. 2E, that the frequency band of the collocation candidate site 340 is 28 GHz. This information is consistent with, and defined by, the 5G mmW collocation process (or workflow) selected by the user in the screen 300A. The character "1" in the symbol 257 of the site ID 324 indicates, with reference to the table 267 in FIG. 2E, that the frequency band of the existing site 332 is 1.7 GHz, i.e., a different communication technology from the 5G mmW (28 GHz) communication technology of the collocation candidate site 340.

The portion of the site ID 324 that is modified to obtain a corresponding portion in the site ID 360 comprises the first symbol 258 among the symbols 258-259 designating the sequence number of the site ID 324. The symbol 258 is often unused because it is unlikely that all six symbols (about a million of sequence numbers) 258-259 are needed to identifying all sites in a sub-region. The symbol 348 of the site ID 360 corresponds to the unused symbol 258 of the site ID 324, and is not used as part of the sequence number of the site ID 360. Instead the symbol 348, also referred to herein as a collocation flag (or collocation class) symbol, designates a collocation status of the site. As shown in the table 368, when the character in the symbol 348 is "0," the corresponding site is not collocated, and when the character in the symbol 348 is "6" (or another character other than "0") the corresponding site is collocated.

The sequence number in the site ID 360 includes five symbols 359, i.e., one symbol fewer than the sequence number (six symbols) in the site ID 324. The characters "00478" in the symbols 359 are the same as the characters "00478" in the symbols 259 of the site ID 324. In other words, except for the first symbol 258, 348, the sequence number (in the symbols 259 and in the symbols 359) is the same for both the site ID 324 and the site ID 360. The total number of symbols in the site ID 360 remains the same as the total number of symbols in the site ID 324. As a result, in at least one embodiment, no significant changes are needed by the system to adapt to the new or modified format of the site ID 360.

In the example in FIG. 3I, the collocation candidate site 340 is given a unique site ID "RAC2323600478". This site ID indicates the following information about the collocation candidate site 340: Operator R, Vendor A, physically located in region (jurisdiction) Tokai and sub-region (prefecture) Aichi, Class 2 (Outdoor Micro), frequency band of 28 GHz, collocation status Yes, and sequence number of 00478. The site ID 360 "RAC2323600478" differs from the site ID 324 "RAC2321000478" in two symbols, i.e., the symbol 357 (frequency band), and the symbol 348 (collocation flag or collocation class).

In some embodiments, the site ID 360 of the collocation candidate site 340 is automatically generated by the system. In at least one embodiment, the site ID 360 of the collocation candidate site 340 is specified, wholly or partly, by the user. In some embodiments, the unique site ID 360 of the collocation candidate site 340 is used to identify the collocation candidate site 340 during the site installation at the same physical location as the existing site 332, and/or during communication by/with the collocated site after the site installation has been completed, as described herein with respect to the site ID 350 and/or the collocation candidate site 380.

In FIG. 3J, a screen 300J, similar to the screen 300G, of the user interface is displayed to show basic details of the collocation candidate site 340 (or collocated site after site installation). Specifically, the screen 300J shows that the collocation candidate site 340 has a site name 343 identical to the site name 323 of the existing site 332, the site ID 360 as described with respect to FIG. 3I, and the unique site ID 322 of the corresponding nominal site. The screen 300J further shows a site type 345 "5G mmW Pole ODSC" of the collocation candidate site 340, i.e., the collocation candidate site 340 is a 5G mmW site. The screen 300J further shows physical location information 346 of the collocation candidate site 340 which includes the latitude and longitude of the existing site 332. No collocation flag is shown in the screen 300J. A collocation flag is not needed, because the collocation status of the collocation candidate site 340 is reflected in the site ID 360 itself, e.g., by the collocation flag symbol 348. In some embodiments, except for a different format for the site ID (e.g., 324) of a collocation candidate site (e.g., 340) and the absence of a collocation flag, site collocation with different network generations is similar to site collocation within the same network generation as described with respect to FIGS. 3D-3G.

In a further example (not shown) of site collocation with different network generations, a collocation process is performed for collocating a 5G Sub6 site at an existing 4G ODSC site. The existing site has a unique site ID "RAA1321000999" which is modified to obtained a unique site ID "REA1322600999" of a collocation candidate site. Compared to the unique site ID of the existing site, the unique site ID of the collocation candidate site indicates a change of Vendor from "A" to "E", a change of frequency band from "1" (4G) to "2" (5G), and the use of a collocation flag to indicate the collocation status. The remaining symbols, including the sequence number (the last five symbols), remain unchanged.

In some embodiments, where site collocation is performed within the same network generation (e.g., a 5G Sub6 site is to be collocated with a 5G mmW site as described with respect to FIGS. 3D-3F), the site ID (e.g., 250) of the existing site (e.g., 282) and the site ID (e.g., 350) of the collocation candidate site (e.g., 380) have the same format (e.g., as described with respect to FIG. 2E). A separate collocation flag (e.g., 396) outside the site ID is generated to indicate the collocation status of the existing site and the collocation candidate site.

In some embodiments, where site collocation is performed for different network generations (e.g., a 5G site is to be collocated with a 4G site as described with respect to FIGS. 3H-3J), the site ID (e.g., 324) of the existing site (e.g., 332) and the site ID (e.g., 360) of the collocation candidate site (e.g., 340) have different formats (e.g., as described with respect to FIG. 3I). A separate collocation flag outside the site ID is not needed, because a collocation flag symbol (e.g., 348) in the site ID (e.g., 360) of the collocation candidate site (e.g., 340) is used to indicate the collocation status of the collocation candidate site.

In some embodiments, by implementing site collocation, new or upgraded technology may be added to an existing site, saving costs and time for site survey and/or construction of supporting structures and/or site infrastructure. The existing arrangements, e.g., supporting structures and/or site infrastructure, may be used to facilitate new technology telecommunication signals for the customers. In a simple example, new 5G antennas and corresponding circuitry may be installed over a pole or tower of an existing 4G site. In a further example, 5G antennas and corresponding circuitry of first communication technology (e.g., Sub6) may be installed over a pole or tower of an existing 5G site of the same network generation, but with different, second communication technology (e.g., mmW), or vice versa. The time and costs for a site survey or TSS process as described with respect to FIG. 2C, and the time and costs for construction of the pole or tower and/or associated site infrastructure, may be saved.

In one or more embodiments, a site collocation process comprises reusing a unique site ID of the existing site, by modifying a portion, rather than the entirety, of the site ID to obtain a unique site ID for a collocated, new site. The site ID of the collocated, new site is then used for installation and/or operation of the collocated, new site. In at least one embodiment, the size (e.g., number of symbols) of the site ID of the collocated site remains the same as that of the existing site, causing no significant changes to the system, while permitting the site collocation process to be done in a quick, simple manner. Further features and/or advantages are within the scopes of various embodiments.

Figure 4A:
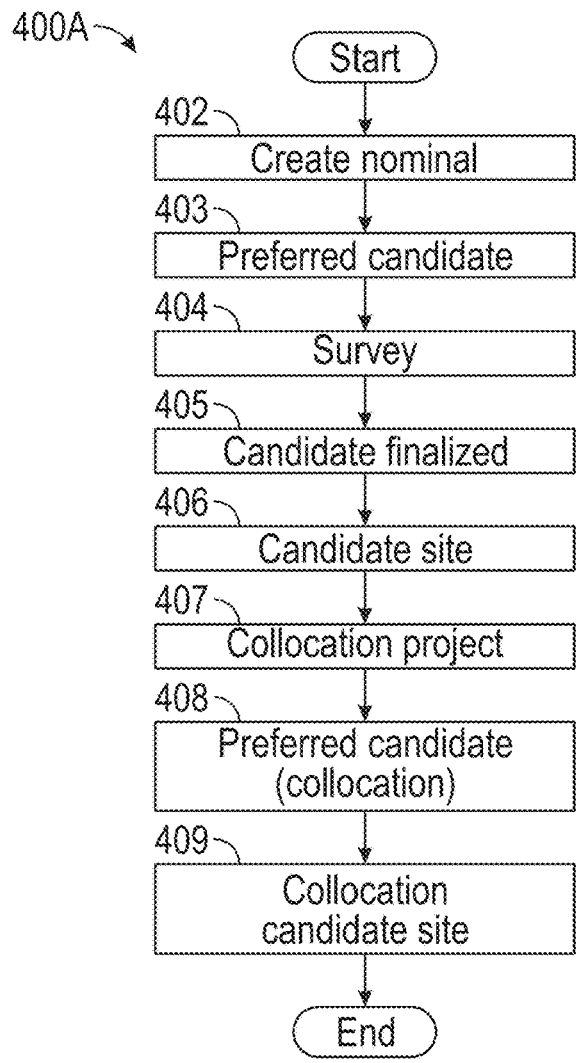
FIGS. 4A-4C are flow charts of various processes of implementing site collocation, in accordance with some embodiments.

FIG. 4A is a flow chart of a process 400A for implementing site collocation, in accordance with some embodiments. In some embodiments, the process 400A is executed, at least partially, by at least one processor that implement one or more components of the services system 110, and include one or more operations and/or functions described with respect to FIGS. 2A-3I. The process 400A comprises operations 402-409.

At operation 402, a nominal site is created or added. For example, a nominal site is added by a person using latitude and longitude provided by a planning tool, as described with respect to FIG. 2A.

At operation 403, one or more candidate sites corresponding to the nominal site are determined. For example, available candidate sites near the nominal site are determined and downloaded by an API call, as described with respect to FIGS. 2B, 2D.

At operations 404-405, site survey is performed and, based on a result of the site survey, a finalized candidate site is selected for site installation. For example, one or more persons, such as a field engineer and/or an administrator, conduct a candidate site selection process and determine the finalized candidate site, in accordance with a workflow, as described with respect to FIG. 2C.

At operation 406, a site ID for the finalized candidate site is generated, for example, as described with respect to FIG. 2E. In some embodiments, the site ID is generated by the system. Other site information items of the finalized candidate site and/or the nominal site are generated and stored, for example, as described with respect to FIGS. 2F-2G. In some embodiments, the site information of the finalized candidate site, including the site ID, is generated by the system. As described herein, site installation is performed to configure the finalized candidate site to be a working site, which is now referred to as an existing site corresponding to the nominal site.

At operation 407, a collocation process is initiated to create a collocated site. For example, a user selects a nominal site and a collocation project (or collocation workflow) to be executed for the nominal site, as described with respect to FIG. 3A.

At operation 408, a collocation candidate site is selected. For example, an existing site corresponding to the nominal site is downloaded by an API call, as described with respect to FIGS. 3B, 3C. This existing site serves as the basis for configuring a collocation candidate site.

At operation 409, a site ID for the collocation candidate site is generated, for example, as described with respect to FIG. 3D and/or 3I. In some embodiments, the site ID is generated by the system. Other site information items of the collocation candidate site are generated and stored, for example, as described with respect to FIGS. 3E-3H, 3J. In some embodiments, the site information of the collocation candidate site, including the site ID, is generated by the system. As described herein, site installation is performed to configure the collocation candidate site to be a working site, with new or upgraded communication technology, which is now referred to as a collocated site at the same physical location as the existing site corresponding to the nominal site.

Figure 4B:
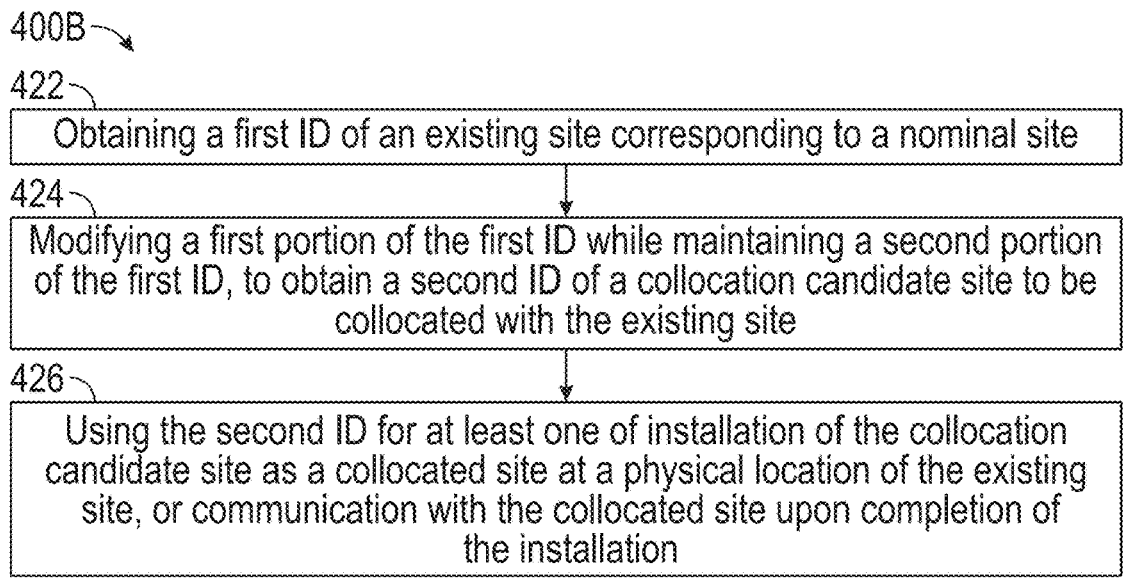

FIG. 4B is a flow chart of a process 400B for implementing site collocation, in accordance with some embodiments. In some embodiments, the process 400B is executed, at least partially, by at least one processor that implement one or more components of the services system 110, and include one or more operations and/or functions described with respect to FIGS. 3A-3J. The process 400B comprises operations 422-426.

At operation 422, a first ID of an existing site corresponding to a nominal site is obtained. For example, the site ID 250 of the existing site 282 corresponding to the nominal site 281 is obtained, as described with respect to FIGS. 3A-3D, 3H-3I.

At operation 424, a first portion of the first ID is modified, while maintaining a second portion of the first ID, to obtain a second ID of a collocation candidate site to be collocated with the existing site. For example, as described with respect to FIGS. 3D, 3I, a first portion of the site ID 250, 324 includes at least information of the communication technology supported by the existing site 282, 332 and/or a unused symbol. This first portion of the site ID 250, 324 is modified to include information of different communication technology supported by the collocation candidate site 380, 340 and/or information about the collocation status of the collocation candidate site 340. A second portion of the site ID 250, 324 includes at least information of the physical location of the existing site 282, 332 and/or information of the class of the existing site 282, 332. This second portion is unchanged. Other information in the site ID 250 may be changed, or not changed, depending on particular situations. Such other information includes information about Vendor and Operator. A sequence number is generated for the collocation candidate site 380, 340. As a result, a site ID 350, 360 of the collocation candidate site 380, 340 is generated fully, or at least partially, by the system.

At operation 426, the second ID is used for at least one of installation of the collocation candidate site as a collocated site at a physical location of the existing site, or communication with the collocated site upon completion of the installation, for example, as described herein.

Figure 4C:
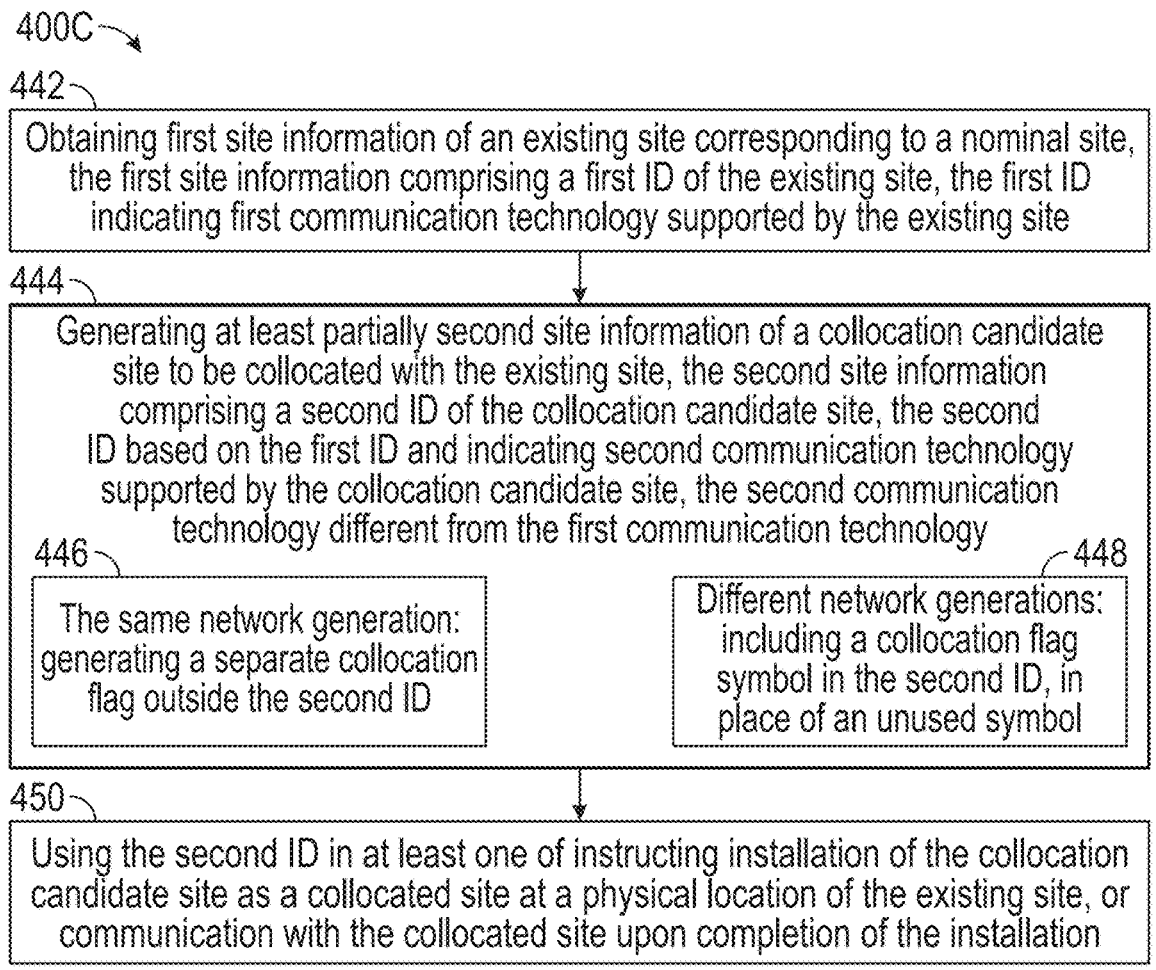

FIG. 4C is a flow chart of a process 400C for implementing site collocation, in accordance with some embodiments. In some embodiments, the process 400C is executed, at least partially, by at least one processor that implement one or more components of the services system 110, and include one or more operations and/or functions described with respect to FIGS. 3A-3J. The process 400C comprises operations 442-450.

At operation 442, first site information of an existing site corresponding to a nominal site is obtained, the first site information comprises a first ID of the existing site, and the first ID indicates first communication technology supported by the existing site. For example, site information of an existing site 282 corresponding to a nominal site 281 is obtained, as described with respect to FIGS. 3B, 3C. The site information comprises a site ID 250, 324 of the existing site 282, 332, and the site ID 250, 324 indicates first communication technology, e.g., frequency band "3" in the site ID 250 or frequency band "1" in the site ID 324, supported by the existing site 282, 332, as described with respect to FIGS. 3D, 3I.

At operation 444, second site information of a collocation candidate site to be collocated with the existing site is at least partially generated. The second site information comprises a second ID of the collocation candidate site. The second ID is based on the first ID and indicates second communication technology supported by the collocation candidate site, wherein the second communication technology is different from the first communication technology. For example, site information of a collocation candidate site 380 to be collocated with the existing site 282 is at least partially generated, as described with respect to FIGS. 3D, 3E. The site information of the collocation candidate site 380, 340 comprises a site ID 350, 360 of the collocation candidate site 380, 340. The site ID 350, 360 is based on the site ID 250, 324 and indicates second communication technology supported by the collocation candidate site, wherein the second communication technology, e.g., frequency band "2" in the site ID 350 or frequency band "3" in the site ID 360, is different from the first communication technology, e.g., frequency band "3" in the site ID 250 or frequency band "1" in the site ID 324. Operation 444 further comprises operation 446 or operation 448, depending on the network generations of the existing site and the collocation candidate site.

At operation 446, in response to the first communication technology and the second communication technology being of the same network generation, a separate collocation flag is generated outside the second ID. For example, when site collocation is performed within the same network generation 5G, as described with respect to FIGS. 3D-3F, a separate collocation flag 396 outside the site ID is generated to indicate the collocation status of the existing site and the collocation candidate site.

At operation 448, in response to the first communication technology and the second communication technology being of different network generations, a collocation flag symbol is included in the second ID, in place of an unused symbol. For example, when site collocation is performed to collocate a 5G site with an existing 4G site, as described with respect to FIGS. 3H-3J, a collocation flag symbol 348 is included in the site ID 360, in place of an unused symbol 258 in the site ID 324.

At operation 450, the second ID is used in at least one of instructing installation of the collocation candidate site as a collocated site at a physical location of the existing site, or communication with the collocated site upon completion of the installation, for example, as described herein. In at least one embodiment, one or more advantages described herein are achievable in one or more of the processes 400A, 400B, 400C.

The described methods and algorithms include example operations, but they are not necessarily required to be performed in the order shown. Operations may be added, replaced, changed order, and/or eliminated as appropriate, in accordance with the spirit and scope of embodiments of the disclosure. Embodiments that combine different features and/or different embodiments are within the scope of the disclosure and will be apparent to those of ordinary skill in the art after reviewing this disclosure.

Figure 5:
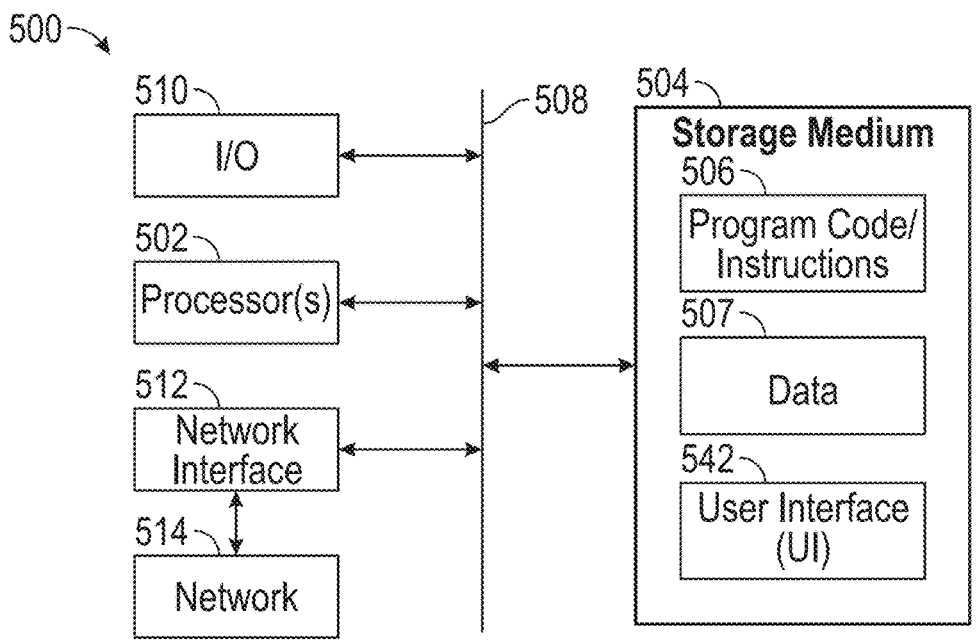
FIG. 5 is a schematic block diagram of a computer system, in accordance with some embodiments.

FIG. 5 is a schematic block diagram of a computer system 500, in accordance with some embodiments. Examples of the computer system 500 include, but are not limited to, desktop, a laptop, a tablet, a smart phone, a server, or the like.

The computer system 500 includes a hardware processor 502 and a non-transitory, computer-readable storage medium 504. Storage medium 504, amongst other things, is encoded with, i.e., stores, computer program code 506, i.e., a set of executable instructions, such as one or more algorithms, programs, applications, sets of executable instructions for a system, component, and/or module, as described with respect to one or more of FIGS. 1A-4. Execution of instructions 506 by hardware processor 502 implements a portion or all of the methods described herein in accordance with one or more embodiments (hereinafter, the noted processes and/or methods).

Processor 502 is coupled to non-transitory computer-readable storage medium 504 via a bus 508. Processor 502 is also coupled to an I/O interface 510 by bus 508. A network interface 512 is connected to processor 502 via bus 508. Network interface 512 is connected to a network 514, so that processor 502 and computer-readable storage medium 504 are connectable to external elements or devices via network 514. Processor 502 is configured to execute computer program code 506 encoded in computer-readable storage medium 504 in order to cause computer system 500 to be usable for performing a portion or all of the noted processes and/or methods. In one or more embodiments, processor 502 comprises a central processing unit (CPU), a multi-processor, a distributed processing system, an application specific integrated circuit (ASIC), and/or a suitable hardware processing unit.

In one or more embodiments, computer-readable storage medium 504 comprises an electronic, magnetic, optical, electromagnetic, infrared, and/or a semiconductor system (or apparatus or device). For example, computer-readable storage medium 504 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 504 includes a compact disk-read only memory (CD-ROM), a compact disk-read/write (CD-R/W), and/or a digital video disc (DVD).

In one or more embodiments, storage medium 504 stores computer program code 506 configured to cause computer system 500 to be usable for performing a portion or all of the noted processes and/or methods. In one or more embodiments, storage medium 504 also stores information or data 507, such as event data, consumer data, business data, policies, component configurations or the like, used in a portion or all of the noted processes and/or methods.

I/O interface 510 is coupled to external circuitry. In one or more embodiments, I/O interface 510 includes a keyboard, keypad, mouse, trackball, trackpad, touchscreen, and/or cursor direction keys for communicating information and commands to processor 502. Computer system 500 is configured to receive information through I/O interface 510. The information received through I/O interface 510 includes one or more of instructions, data, policies, configurations and/or other parameters for processing by processor 502. The information is transferred to processor 502 via bus 508. Computer system 500 is configured to receive information related to a user interface through I/O interface 510. The information is stored in computer-readable storage medium 504 as user interface (UI) 542.

Network interface 512 allows computer system 500 to communicate with network 514, to which one or more other computer systems are connected. Network interface 512 includes wireless network interfaces such as BLUETOOTH, WIFI, WIMAX, GPRS, LTE, 5G, 6G, WCDMA, or the like; or wired network interfaces such as ETHERNET, USB, IEEE-864 or the like. In one or more embodiments, a portion or all of noted processes and/or methods, is implemented in two or more computer system 500.

In some embodiments, a portion or all of the noted processes and/or methods is implemented as a standalone software application for execution by one or more hardware processors. In some embodiments, a portion or all of the noted processes and/or methods is implemented as a software application that is a part of an additional software application. In some embodiments, a portion or all of the noted processes and/or methods is implemented as a plug-in to a software application.

In some embodiments, a portion or all of the noted processes and/or methods is realized as functions of a program stored in a non-transitory computer readable recording medium. The non-transitory computer readable recording medium having the program stored therein is a computer program product. Examples of a non-transitory computer-readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, or the like.

The foregoing outlines features of several embodiments so that those skilled in the art better understand the aspects of the present disclosure. Those skilled in the art should appreciate that they readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they make various changes, substitutions, and alterations herein without departing from the spirit and scope of the present disclosure.

What is claimed is:

1. A method of implementing site collocation, said method performed at least in part by at least one processor, said method comprising:
    obtaining a first identification (ID) of an existing site corresponding to a nominal site;
    modifying a first portion of the first ID, while maintaining a second portion of the first ID, to obtain a second ID of a collocation candidate site to be collocated with the existing site; and
    using the second ID for at least one of
        installation of the collocation candidate site as a collocated site at a physical location of the existing site, or
        communication with the collocated site upon completion of the installation.

2. The method of claim 1, wherein
    the first portion of the first ID comprises first information indicating first communication technology supported by the existing site, and
    in said modifying, the first information is changed to second information in the second ID, the second information indicating second communication technology supported by the collocation candidate site, the second communication technology different from the first communication technology.

3. The method of claim 1, wherein
    the first portion of the first ID comprises first information indicating a first vendor associated with the existing site, and
    in said modifying, the first information is changed to second information in the second ID, the second information indicating a second vendor associated with the collocation candidate site, the second vendor different from the first vendor.

4. The method of claim 2, wherein
    the first communication technology and the second communication technology are of a same network generation,
    said modifying comprises generating a second sequence number of the second ID, the second sequence number different from a first sequence number of the first ID, and
    said method further comprises generating a collocation flag outside the second ID, the collocation flag indicating that the existing site and the collocation candidate site are collocated at the same physical location.

5. The method of claim 1, wherein
    the second portion of the first ID includes information about the physical location of the existing site, and remains unchanged in the second ID to indicate that the collocation candidate site has the same physical location as the existing site.

6. The method of claim 1, wherein said modifying comprises
    modifying a first symbol in the first ID to a different, second symbol in the second ID, the first symbol indicating first communication technology of a first network generation and supported by the existing site, the second symbol indicating second communication technology of a second network generation and supported by the collocation candidate site, the second communication technology different from the first communication technology, the second network generation different from the first network generation,
    changing a unused symbol in a first sequence number of the first ID to a collocation flag symbol in the second ID, the collocation flag symbol indicating a collocation status of the collocation candidate site, and
    keeping remaining symbols in the first sequence number of the first ID unchanged, and making the remaining symbols in the first sequence number a second sequence number of the second ID, a number of symbols in the second sequence number being one symbol fewer than a number of symbols in the first sequence number.

7. The method of claim 6, wherein
the first ID and the second ID contain a same number of symbols.

8. The method of claim 1, wherein
each of the first ID and the second ID comprises:
   a symbol indicating an operator of the corresponding existing site or collocation candidate site,
   a symbol indicating a vendor associated with the corresponding existing site or collocation candidate site,
   a symbol indicating a region containing the physical location of the existing site and collocation candidate site,
   two symbols indicating a sub-region containing the physical location of the existing site and collocation candidate site,
   a symbol indicating a class of the existing site and collocation candidate site,
   a symbol indicating a frequency band of the corresponding existing site or collocation candidate site, and
   a series of symbols indicating a sequence number of the corresponding existing site or collocation candidate site,
the series of symbols of the first ID comprises a first symbol and remaining symbols, and
the series of symbols of the second ID comprises:
   a collocation flag symbol and the remaining symbols in the series of symbols of the first ID, the collocation flag symbol corresponding to the first symbol in the series of symbols of the first ID and indicating a collocation status of the collocation candidate site, or
   one or more symbols corresponding to and different from the remaining symbols in the series of symbols of the first ID.

9. The method of claim 1, further comprising:
in response to user input of the nominal site and a collocation process to be performed for the nominal site,
   obtaining first site information of the existing site corresponding to the nominal site, the first site information including the first ID of the existing site; and
after said modifying the first ID to obtain the second ID, generating second site information of the collocation candidate site, the second site information comprising the second ID; and
instructing the installation at the collocation candidate site in accordance with the second site information.

10. The method of claim 9, wherein
the existing site comprises:
   a supporting structure, and
   first communication equipment supporting first communication technology and installed on the supporting structure, and
said installation comprises installing second communication equipment of the collocation candidate site on the supporting structure of the existing site, the second communication equipment supporting second communication technology different from the first communication technology.

11. The method of claim 1, further comprising:
obtaining one or more candidate sites within a predetermined radius from the nominal site;
performing site survey to determine, among the one or more candidate sites, a candidate site for installation of the nominal site;
generating the first ID for the determined candidate site; and
instructing installation of the determined candidate site to obtain the existing site corresponding to the nominal site.

12. The method of claim 11, further comprising:
using the first ID for communication with the existing site upon completion of the installation of the existing site.

13. A system for implementing site collocation, the system comprising:
at least one processor; and
at least one computer readable storage medium coupled to the at least one processor and configured to store executable instructions that, when executed by the at least one processor, cause the at least one processor to:
   obtain first site information of an existing site corresponding to a nominal site, the first site information comprising a first identification (ID) of the existing site, the first ID indicating first communication technology supported by the existing site,
   generate at least partially second site information of a collocation candidate site to be collocated with the existing site, the second site information comprising a second ID of the collocation candidate site, the second ID based on the first ID and indicating second communication technology supported by the collocation candidate site, the second communication technology different from the first communication technology, and
   use the second ID in at least one of
      instructing installation of the collocation candidate site as a collocated site at a physical location of the existing site, or
      communication with the collocated site upon completion of the installation.

14. The system of claim 13, wherein the executable instructions, when executed by the at least one processor, cause the at least one processor to:
visually present a first input area for receiving user input of the nominal site and a collocation process to be performed for the nominal site, and
based on the nominal site input in the first input area, obtain the first site information of the existing site corresponding to the nominal site.

15. The system of claim 14, wherein the executable instructions, when executed by the at least one processor, cause the at least one processor to:
upon user input of the nominal site and the collocation process in the first input area, visually present a second input area for receiving user instruction to search for the existing site corresponding to the nominal site and obtain the first site information of the existing site.

16. The system of claim 15, wherein the executable instructions, when executed by the at least one processor, cause the at least one processor to:
in response to user instruction received in the second input area, search for the existing site as a site which is nearest to the nominal site and satisfies one or more conditions defined in the collocation process.

17. The system of claim 13, wherein the executable instructions, when executed by the at least one processor, cause the at least one processor to:
visually present the second ID obtained by modifying a first portion of the first ID while maintaining a second portion of the first ID,
wherein
the first portion of the first ID comprises a first symbol indicating the first communication technology supported by the existing site, and the first symbol is changed to a different, second symbol in the second ID, the second symbol indicating the different second communication technology supported by the collocation candidate site, and the second portion of the first ID includes information about the physical location of the existing site, and remains unchanged in the second ID to indicate that the collocation candidate site has the same physical location as the existing site.

18. The system of claim 13, wherein the first communication technology and the second communication technology are of different network generations, and the executable instructions, when executed by the at least one processor, cause the at least one processor to visually present, in a same screen, a unique ID of the nominal site corresponding to the existing site and the collocation candidate site, information about the physical location of the existing site and the collocation candidate site, and the second ID of the collocation candidate site, the second ID comprising a collocation flag symbol indicating a collocation status of the collocation candidate site.

19. The system of claim 13, wherein the first communication technology and the second communication technology are of a same network generations, and the executable instructions, when executed by the at least one processor, cause the at least one processor to visually present, in a same screen, the first ID of the existing site, information about the physical location of the existing site and the collocation candidate site, a unique ID of the nominal site corresponding to the existing site and the collocation candidate site, the second ID of the collocation candidate site, and a collocation flag indicating that the existing site and the collocation candidate site are collocated at the same physical location.

20. A computer program product, comprising a non-transitory, tangible computer readable storage medium storing a computer program that, when executed by at least one processor, causes the at least one processor to obtain first site information of an existing site corresponding to a nominal site, the first site information comprising a first identification (ID) of the existing site, the first ID indicating first communication technology supported by the existing site, generate at least partially second site information of a collocation candidate site to be collocated with the existing site, the second site information comprising a second ID of the collocation candidate site, the second ID based on the first ID and indicating second communication technology supported by the collocation candidate site, the second communication technology different from the first communication technology, and use the second ID in at least one of instructing installation of the collocation candidate site as a collocated site at a physical location of the existing site, or communication with the collocated site upon completion of the installation.

* * * * *